( 12 ) United States Patent
Kumar

(10) Patent No.: US 7,532,635 B2
(45) Date of Patent: May 12, 2009

(54) METHODS FOR MEMORY ASSIGNMENT SCHEMES AND ARCHITECTURE FOR SHAREABLE PARALLEL MEMORY MODULE BASED INTERNET SWITCHES

(75) Inventor: Sanjeev Kumar, Edinburg, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 340 days.

(21) Appl. No.: 11/213,626

(22) Filed: Aug. 26, 2005

(65) Prior Publication Data

US 2006/0062232 A1   Mar. 23, 2006

Related U.S. Application Data

(60) Provisional application No. 60/604,925, filed on Aug. 27, 2004.

(51) Int. Cl.
  *H04L 12/28* (2006.01)
(52) U.S. Cl. .................. 370/412; 370/360; 370/363; 370/372; 370/395
(58) Field of Classification Search .............. 370/360, 370/363, 372, 387, 388, 395–399
  See application file for complete search history.

(56) References Cited

U.S. PATENT DOCUMENTS

| 5,157,654 | A | * | 10/1992 | Cisneros | 370/414 |
| 5,210,744 | A | * | 5/1993 | Yamanaka et al. | 370/413 |
| 5,341,483 | A | * | 8/1994 | Frank et al. | 711/206 |
| 5,649,217 | A | * | 7/1997 | Yamanaka et al. | 710/52 |
| 5,842,224 | A | * | 11/1998 | Fenner | 711/202 |
| 5,887,146 | A | | 3/1999 | Baxter et al. | 710/104 |
| 6,011,775 | A | | 1/2000 | Bonomi et al. | 370/230 |
| 6,014,690 | A | | 1/2000 | VanDoren et al. | 709/215 |
| 6,122,274 | A | * | 9/2000 | Kumar | 370/388 |
| 6,687,247 | B1 | | 2/2004 | Wilford et al. | 370/392 |
| 6,721,271 | B1 | * | 4/2004 | Beshai et al. | 370/232 |
| 7,006,505 | B1 | * | 2/2006 | Bleszynski et al. | 370/395.72 |
| 7,043,515 | B2 | * | 5/2006 | Stojancic | 708/491 |
| 7,093,092 | B2 | * | 8/2006 | Stojancic | 711/164 |
| 7,142,546 | B2 | * | 11/2006 | Kamiya | 370/395.4 |
| 2004/0143710 | A1 | | 7/2004 | Walmsley | 711/144 |

OTHER PUBLICATIONS

Ahmadi et al., "A high-performance switch fabric for integrated circuit and packet switching," *Proc. IEEE Infocom.*, pp. 9-18, 1988.

(Continued)

*Primary Examiner*—Edan Orgad
*Assistant Examiner*—Andrew C Lee
(74) *Attorney, Agent, or Firm*—Fulbright & Jaworski LLP

(57) ABSTRACT

Systems and methods are described for high-speed memory assignment schemes for routing packets in a sharable parallel memory module based switch system. A method includes receiving a parameter, determining availability of memory location, determining if an available memory location is pre-assigned, and assigning a packet a parameter if the memory location is available. Systems of the present invention provides hardware and/or software based components for implementing the steps of receiving a parameter, determining available memory location, determining if available memory location is pre-assigned, and assigning a packet a parameter if the memory location is available.

7 Claims, 15 Drawing Sheets

OTHER PUBLICATIONS

Ajmone Marsan et al., "Packet scheduling in input-queued cell-based switches," *Proc. IEEE Infocom*, 2:1085-1094, 2001.

Ajmone Marsan et al., "RPA: a simple efficient and flexible policy for input buffer ATM switches," *IEEE Lett.*, 1(3):83-86, 1997.

Chao and Park, "Centralized contention resolution schemes for a large capacity optical ATM switch," *Proc. IEEE ATM Workshop*, pp. 11-16, 1998.

Chao et al., Broadband Packet Switching Technologies: A Practical Guide to ATM Switches and IP Routers, John Wiley & Sons, New York, 2001.

Chao, "Satrun: a terabit packet switch using dual round-robin," *IEEE Commun. Mag.*, 38(12):78-79, 2000.

Charny et al., "Algorithms for providing bandwidth and delay guarantees in input-buffered crossbar with speedup," *Proc. IEEE IWQoS '98*, pp. 235-244, 1998.

Choudhury and Hahne, "Dynamic Queue Length Thresholds for Shared-Memory Packet Switches," *IEEE/ACM Transactions on Networking*, 6(2):130-140, 1998.

Delgado-Frias and Nyathi, "A VLSI high-performance encoder with priority lookahead," *Proceedings of the 8th Great Lakes Symposium*, pp. 59-64, 1998.

Garcia-Haro and Jajszczyk, "ATM shared-memory switching architectures" *IEEE Network*, 8(4):18-26, 1994.

Guerin and Sivarajan, "Delay and throughput performance of speeded-up input queueing packet switches," IBM Research Report RC 20892, pp. 101-106, 1997.

Hluchyj and Karol, "Queueing in high-performance packet switching," *IEEE J. Select Areas Commun.*, 6(9):1587-1597, 1998.

Hluchyj and Karol, "Queueing in space division packet switching," *Proc. IEEE Infocom*, pp. 334-343, 1988.

Irland, "Buffer management in a packet switch," *IEEE Transactions on Communications*, 26(3):328-337, 1978.

Kamoun and Kleinrock, "Analysis of shared finite storage in a computer node enivronment under general traffic conditions," *IEEE Transactions on Communications*, 28:992-1003, 1980.

Kumar and Agrawal, "The sliding-window approach to high performance ATM switching for broadband networks," *Proc. IEEE Globecom*, 772-777, 1996.

Kumar and Doganer, "Memory Bandwidth Performance of the Sliding-Window based Routers/Switches" *Proc. IEEE Workshop on Local and Metropolitan Area Networks*, pp. 205-210, 2004.

Kumar et al., "Effect of traffic burstiness on memory bandwidth of the sliding-window switch architecture," *3rd International 107 Conference on Networking* (ICN'2004), Gosier, Guadeloupe, French Caribbean, I:147-151, 2004.

Kumar et al., "Performance Comparison of Memory-Sharing Schemes for Internet Switching Architecture," *Proc. Int. Conf. Networking*, 2004.

Kumar, "The Sliding-Window Packet Switch: A new class of packet switch architecture with plural memory modules and decentralized control," *IEEE Journal on Selected Areas in Communications*, 21(4):656-673, 2003.

Liew, "Performance of a various input-buffered and output-buffered ATM switch design principles under bursty traffic: simulation study," *IEEE Trans. Commun.*, 42:1371-1379, 1994.

McKeown, "Scheduling algorithms for input-queued cell switches," Ph.D. Thesis, University of California at Berkeley, 1995.

Mekkitikul and McKeown, "A starvation-free algorithm for achieving 100% throughput in an input-queued switch," *Proc. ICCCN'96*, pp. 226-231, 1996.

Mollenauer, "Standards for Metropolitan area networks," *IEEE Commun. Mag.*, 26(4):15-19, 1988.

Munoz and Kumar, "On Design of Internet Routers/Switches deploying Parallel Memory Modules," *Proc. Intl. Conf. Computing*, 2004.

Narasimha, "The Batcher-banyan self-routing network: universality and simplification," *IEEE Trans. Commun.*, 36(10):1175-1178, 1988.

Newman, "Fast packet switching for broadband ISDN," *Second IEEE National Conference on Telecommunications*, pp. 391-396, 1989 (abstract).

Sakurai et al., "Large-scale ATM multistage switching network with shared buffer memory switches," *IEEE Communications*, 29:90-96, 1991.

Yamanaka et al., "Scalable shared-buffering ATM switch with a versatile searchable queue," *IEEE J. Select. Areas Commun.*, 15:773-784, 1997.

Yeh, et al., "The knockout switch: A simple modular architecture for high-performance packet switching," *IEEE J. Select Areas Commun*, 5(8):5274-1283, 1987.

PCT International Search Report and Written Opinion, issued in International Application No. PCT/US05/30466, dated Oct. 23, 2007.

* cited by examiner

METHODS FOR MEMORY ASSIGNMENT SCHEMES AND ARCHITECTURE FOR SHAREABLE PARALLEL MEMORY MODULE BASED INTERNET SWITCHES

This application claims priority to, and incorporates by reference, U.S. Provisional Patent Application Ser. No. 60/604,925 entitled "METHODS FOR PARAMETER-ASSIGNMENT SCHEMES AND ARCHITECTURE FOR SLIDING-WINDOW BASED INTERNET SWITCHES," which was filed on Aug. 27, 2004.

STATEMENT AS TO RIGHTS TO INVENTIONS MADE UNDER FEDERALLY-SPONSORED RESEARCH AND DEVELOPMENT

Aspects of this invention were made with government support of the CITeC. Accordingly, the government may have certain rights in this invention.

BACKGROUND OF THE INVENTION

1. Field of the Invention

The present invention relates generally to switches and/or routers. More particularly, the present invention relates to methods and systems for high-speed parameter assignment schemes for routing packets in sharable memory module based switch system.

2. Description of Related Art

The design of high-performance packet switches is essential due to the exponential growth of data traffic in systems such as the Internet. Further, the increase in bursty data traffic in high-speed networks and Internets has been the cause for a higher demand in throughput performance of packet switches and routers. One main objective in switch design and memory allocation in the switch is to provide the best possible delay-throughput performance that can scale almost linearly as the switch grows in size and capacity. It is known in the art that sharing of memory resources among the input and output ports of the switch improves throughput performance of a packet switch under heavy traffic, particularly bursty traffic.

Due to the reduced packet rate loss rate and throughput performance, the shared-memory based switches are suited for handling the dynamically changing nature of bursty data traffic in high-speed packet networks and Internets. However, scalability of the shared-memory based switching systems has been restricted by high memory bandwidth requirements, segregation of memory space, and centralized control of switching functions that cause the performance of the switch to degrade as shared-memory based system increases in size.

The referenced shortcomings are not intended to be exhaustive, but rather are among many that tend to impair the effectiveness of previously known techniques for high speed switches; however, those mentioned here are sufficient to demonstrate that the methodologies appearing in the art have not been altogether satisfactory and that a significant need exists for the techniques described and claimed in this disclosure.

SUMMARY OF THE INVENTION

In one respect, the invention involves a method for assigning a memory module to an incoming packet. The method includes steps for receiving the incoming packet. The method also includes a step to modify (e.g., incrementing or decrementing) a parameter in a MOD m fashion to a memory location in a memory module for the incoming packet. The method determines if the memory location in the memory module is available using an array. An array, as used in this disclosure, includes, without limitation, any multi-dimensional array, a scan table, pointers, a link list, and the like. If the memory location is available, the memory module is assigned to the incoming packet. Alternatively, if the memory location is not available, the parameter is further modified in MOD m fashion to find another memory location.

In other aspects of the invention, a method is provided for assigning a memory module to an incoming packet. The method includes a step for setting the values of a first and second counter to zero. The first counter includes a value that determines a first available memory slot when all memory slots are not available. The method also includes modifying parameter in a MOD m fashion to obtain a memory location in a memory module. Next, the step of determining whether the memory location is available by using an array. If the memory location is available, the method provides a step assigning the memory module to the received incoming packet.

In accordance to other aspects of the invention, a method for assigning memory modules to an incoming packet is provided. The method includes steps for initializing a plurality of queues. The method also includes steps for determining the available memory slots in all the memory modules. For each available slot, the corresponding parameter is provided to the plurality of queues. As such, for every incoming packet, a memory slot may be assigned a parameter from one of the plurality of queues.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
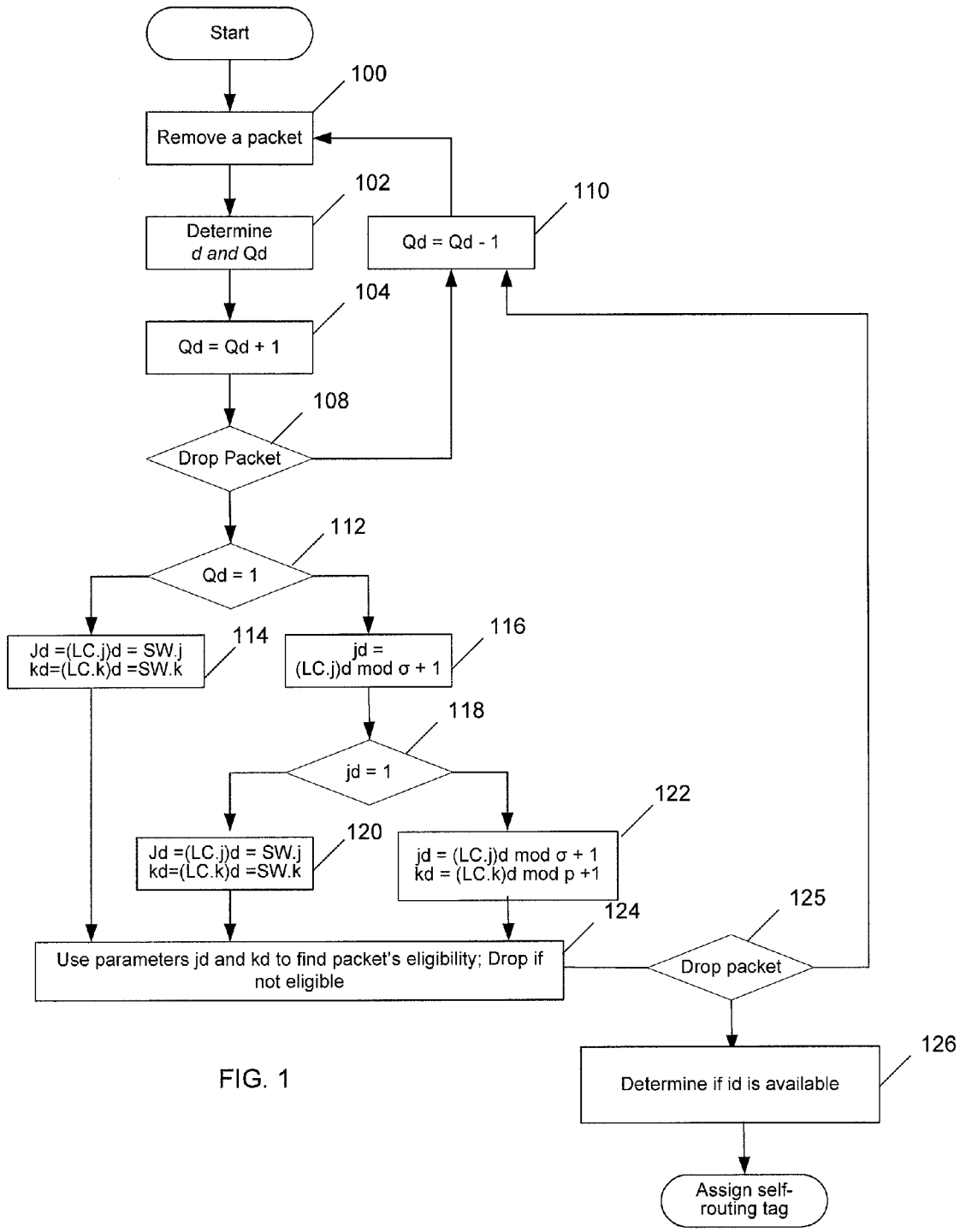
FIG. 1 shows a flow chart of a method for assigning memory module, according to embodiments of the invention.

The disclosure and the various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

A sliding window architecture, as disclosed in U.S. Pat. No. 6,122,274, and incorporated herein by reference, is a type of shareable parallel memory module based switch architecture that is not controlled by any centralized memory controller. In shareable parallel memory modules switch architecture, the memory modules are physically separate but can be shared by packets on incoming and outgoing lines. The memory modules are independent, and thus, use local memory controllers to perform WRITE and READ operations for data packets based on information available locally. The sliding window (SW) switch provides a way to reduce the bottleneck performance created by centralized controllers in prior art switches, such as shared-memory switch architecture.

1. Components and Function of a Sliding-Window Switch

A sliding-window switching system is characterized by the use of independent, parallel memory modules and decentralized control. The switching operation of the sliding-window is partitioned into multiple pipelined stages such as, but not limited to, an input interconnection stage, a self-routing parameter assignment stage, parallel WRITE and READ stages, and an output interconnection stage.

During the input interconnection stage, input lines carry incoming data packets. The incoming packets may be processed by a processing circuit to extract an out port destination address, denoted by d. The destination address of incoming packets is forwarded to a self-routing parameter assignment circuit. During the self-routing parameter stage, a self-routing parameter assignment circuit uses the out port destination address and produces self-routing parameters (i, j, k) for incoming data packets. The parameter i designates the memory module that the packet will be stored in, the parameter j in a packet self-routing tag designates the packet location in $i^{th}$ memory module, and the parameter k designates the packets turn to be read out of memory. The self-routing parameters (i, j, k) are then attached as a self-routing tag to the incoming data packets. As such, the incoming packets may use the self-routing tags to propagate independently through the various stages of the SW system.

During the WRITE stage of an incoming packet, controllers of the SW system may use the parameter j to write the received packet in the $j^{th}$ memory location of a memory module of the SW system. In some embodiments, there is a controller corresponding to an output scan array (OSA) each with σ locations. The $j^{th}$ location of the OSA holds a scan value of a received packet stored in the corresponding $j^{th}$ location of its memory module. OSA of each memory controller may update during the WRITE and READ cycle of data packets to and from the respective locations in the memory modules. Also during the WRITE stage, the associated scan-plane k parameter of the received packet is stored in a corresponding $j^{th}$ location in the OSA of the corresponding memory controller.

During the READ stage of a packet from the $j^{th}$ location of a memory module, the corresponding $j^{th}$ location in the OSA is set to zero to indicate empty memory location in the corresponding memory module. The data packets are outputted from the parallel and independent memory modules and are routed to their respective output destinations by an output interconnection network. Particularly, the output interconnection network may make use of the output port destination information d stored in a packet's header to route each packet to a final destination. In some embodiments, the information d may also be seen as part of the routing tag, with the difference in that instead of residing in the routing tag, the destination information d resides in the header of each incoming packet.

2. Architecture of Parameter Assignment Circuit

As noted above, self-routing parameters help data packets to self propagate through different stages of the switching system. The assignment of self-routing parameters (i, j, k) to the incoming packets may be performed by a parameter assignment circuit (PAC). In some embodiments, the PAC may use, for example, a set of counters and tables, such as a scan table (ST), to facilitate determination of self-routing parameters. To enable faster assignments, a PAC may also include two or more separate processors. It is noted that a single processor may be used to determine the self-routing parameters as well. It is also noted that a software program may be used to determine the self-routing parameters.

In one embodiment, for a two processor scheme, a first processor may receive the destination address of incoming packets from a header processing unit of the sliding-window switch system and may determine and assign j and k parameters for each packet. In some embodiments, the second processor may work to find the $i^{th}$ parameter for a packet while the first processor works in parallel to determine j and k parameters for a next packet. Alternatively, the first and second processor may work in pipeline fashion to determine j and k parameters, and the corresponding $i^{th}$ parameter for incoming packet in a given cycle.

The incoming packets may next enter an assigned Output Slot Vector (OSV), where corresponding j and k parameters of each packet are forwarded to the second processor for determining the parameter i in a two-dimensional array called scan table (ST). The slots of the ST may be designated by ST(i,j), where i denotes the memory module and j denotes an OSV. The row number i of an empty slot (i,j) in the pre-assigned column j of the ST may be assigned as the parameter i of the self-routing tag. The parameter i can have a value from 1 to m, where m is the number of memory modules. The parameter j can have a value from 1 to s, where s is the number of packet locations in the memory modules. The value of ST(i,j) holds the scan variable k of the packet such that ST(i,j)=k, where if k is greater than zero, the $j^{th}$ location of the $i^{th}$ memory module holds a valid packet whose scan-plane value is k. Alternatively, if ST(i,j) is equal to 0 (k is equal to 0), the $j^{th}$ location of the $i^{th}$ memory module in the global memory space may be empty and may not hold a valid packet.

3. Assigning Parameters j and k

In one embodiment, a first processor may receive a destination address of the incoming packet from header processing circuit and uses steps from 100 to 125 in FIG. 1 to assign the j and k parameters. Step 100 shows an initial state in which a plurality of packets are inputted in a given cycle through the incoming ports of a sliding-window switch system and a single packet is extracted for processing. Step 102 determines the destination information (e.g., output port d) for each packet as shown in step 100 which may be performed on the first processor. Additionally, the first processor may include a queue length counter (QLC) which may help determine the queue length $Q_d$ for a packet assigned to output port d in step 102. Step 104 increments the value of $Q_d$ to take into account the new incoming packet arrivals. According to step 108, if ($Q_d$>p.σ), then the packet assigned to port d is dropped and the $Q_d$ value is decreased by one in step 110 and the assignment process loops back to step 100 to process another packet. Here, p.σ. is a predetermined upper limit imposed on the length of an output queue inside the memory space. If the $Q_d$ is greater than Qmax p.σ.), the packet should be dropped in step 108. In one embodiment, a comparison may be performed to determine if the upper limit has been surpassed (step 108). If $Q_d$=1, the packet for a given destination port "d" is the may be the first packet entering the memory module and does not need to wait for other packets to output on a destination port (step 112). Step 114 follows where OSV and the scan plane value of the current location of the SW counter assigns j and k parameters for the incoming packets.

In step 116, the equation $j_d$=(LC.j)$_d$ MOD σ+1 may define consecutive OSV, i.e., OSV following a previous packet's OSV, is assigned as the j parameter for the incoming packet. To assign the k parameter, the assigned OSV equaling $j_d$ may be first examined in step 118. If $j_d$ equals 1 in step 118, then the assigned OSV is on a new scan plane and the scan plane value assigned to the incoming packet may be increased by one, as shown in step 122, where $k_d$=(LC.k)d MOD p+1. In cases where $j_d$ does not equal to 1, then the assigned OSV may be on the same scan plane as the last packet admitted for that destination's output queue and the same value of the LC.k from a counter is assigned as the k parameter in step 120.

Once the j and k parameters are determined, the first processor may determine if the packet qualifies to enter OSV j. In one embodiment, a packet may qualify to enter an OSV only if its entry does not affect the utilization of other output ports of the SW switch. If the packet qualifies, the packet is admitted in step 126, else it is dropped in step 125. The first processor may include control unit for providing the j and k parameters to the second processor for determination of the parameter i.

4. Assigning Parameter i

Figure 2A:
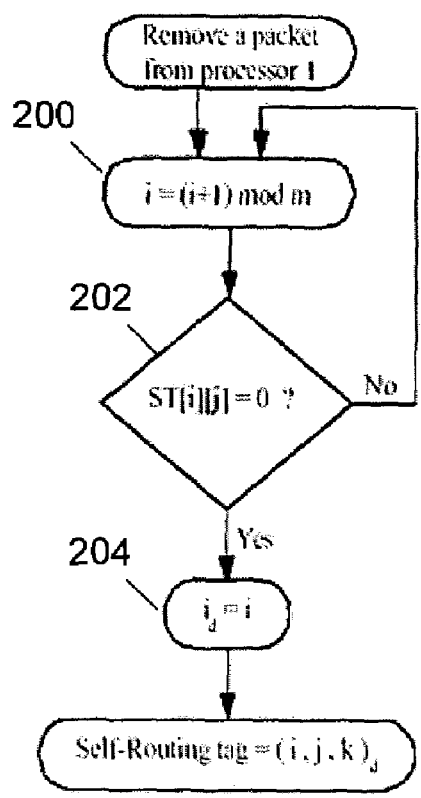
FIGS. 2A-2D show flow charts of methods for assigning a parameter, according to embodiments of the invention.
Figure 2A:
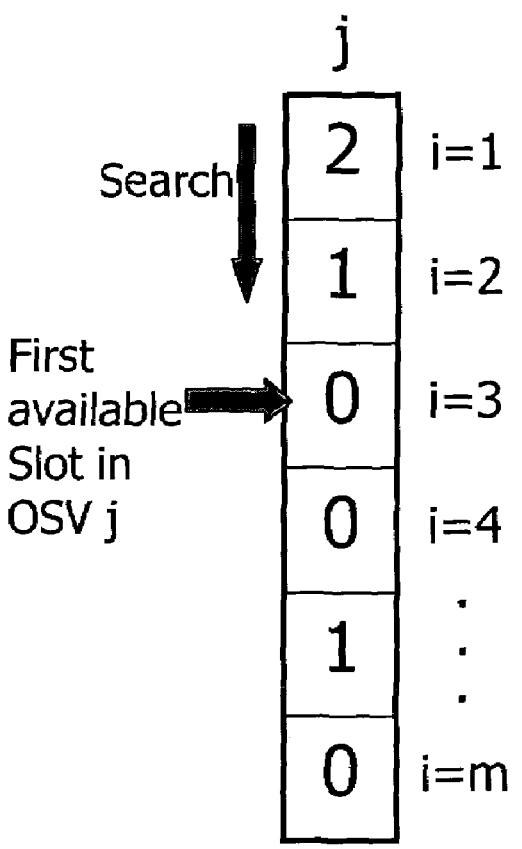

In some embodiment, a packet is received by a second processor from a first processor. The second processor may assign an i parameter to the packet. A next value of i may be obtained by increasing the previously assigned i value (to a previous packet) by 1 in MOD fashion as shown in step 200 of FIG. 2A. If ST(i) equals 0 for near value i, the memory location (i,j) is available and that location is assigned, as shown in steps 202 and 204 of FIG. 2A. The last i value, which is assigned for previous packet in the scan-table is increased by 1 in MOD m fashion. Then, the value of ST(i,j) is compared with zero for new value.

If the ST(i,j) is equal to zero, the $j^{th}$ location of the $i^{th}$ memory module in the memory modules is empty and does not hold a valid packet. The next step will be assigning the new value of i along with j, and k parameters to build a self-routing parameters (i, j, k)$_d$ for the incoming packet.

If the ST(i,j) is not zero, the $j^{th}$ location of the $i^{th}$ memory module holds a valid packet whose scan-plane value is k. The i value may be increased by 1 in MOD m fashion and compare if the value of ST(i,j) equals zero. This process is repeated until the $j^{th}$ location of the $i^{th}$ memory module in the global memory space is empty.

The packets belonging to the same input cycle are assigned different values of i (i.e., the $i^{th}$ memory) module in an increasing order. As an example, if i=3 has been assigned to the first incoming packet of the cycle then for the next incoming packet an attempt is made to assign i>3 for that assigned OSV j. If there are no values greater than i are available for that OSV j, then values less than i may be chosen in a MOD fashion for a given OSV j.

In some embodiments, MOD m operation may be performed by a counter that counts up to m on a general-purpose register, such as a bit counter. Determination of ST(i,j) slot is either empty or not process may be determined with a comparison. If ST(i,j) is equal to zero, then the current i may be assigned as the parameter i of the self-routing tag. If ST(i,j) is not equal to zero then the assignment process may loop back to MOD operation until an empty slot is found. The number of loop backs may be a maximum of the number of memory module because step 125 in FIG. 1 ensures there is available empty slot for a current OSV j. Therefore, the total number of clock cycles to assign i parameter may depend on the number of memory modules (m).

Figure 2B:
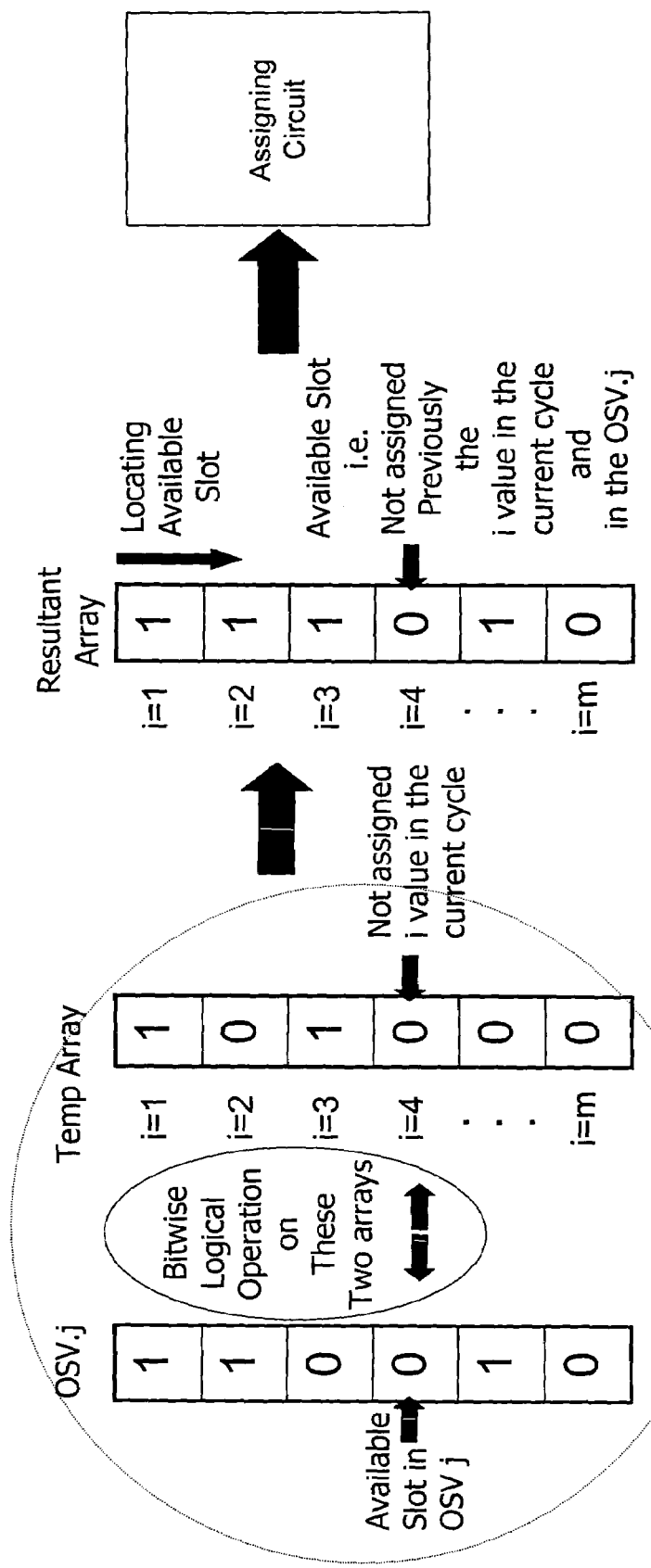

In some embodiments, a parameter assignment scheme may include a temporary array indicted by "TEMP" in FIG. 2B. For each cycle, the temporary array may first be initialized to having all memory locations being available. The temporary array may then be used to maintain the availability or maintain the i parameter assignments (e.g., available memory modules). Referring to FIG. 2B, the temporary array may include a bit value "0" indicating memory modules are available for assignment and a bit value "1" indicating the memory modules that have been assigned or vice versa. The OSV j array may hold the occupancy stats for the OSV designating the $j^{th}$ column in a scan table. In order to determine an i parameter, an operation may be performed using the values from the OSV array and the temp array. In one embodiment, a bit-wise logic function may be performed. Logic gates such as, but not limited to, an AND gate, an OR gate, an XOR gate, or hardware components such as a comparator, multiplexor, or any other hardware components may be used to determine if a memory location is available. Alternatively, the operation may be determined using a computer software program. The computer program, executable on a processor, may include instructions for determining if a memory location is available. The results of the operation is stored in a resultant array, as shown in FIG. 2B.

To assign an i value, an assigning circuit may use the values in the resultant array. In some embodiments, the assigning circuit may be a multiplexer, a comparator, an encoder, an application specific integrated circuit (ASIC), or similar devices. Alternatively, the assigning circuit may include software components including instructions for assigning the i parameters to incoming packets.

Figure 2C:
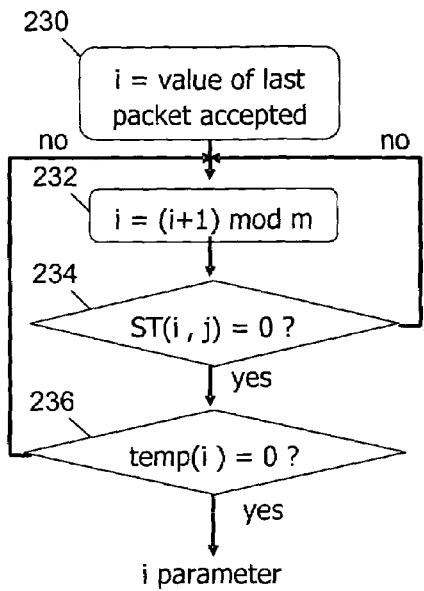

Referring to FIG. 2C, another embodiment for an i parameter assignment scheme of the present invention may first determine the i value of the previous incoming packet (step 230). A temporary i value is determine by incrementing the value of i in step 230 by 1 in a MOD m fashion (step 232). Next, the scan table is used to determine if the location of the memory represented by temporary i is available (step 234). If the memory location is available, the temporary i is compared to determine if the value of i is equal to zero (step 236). If the value is zero, then the temporary i is assigned as the i value for the incoming packet.

However, if the memory location is not equal to zero (step 234), then the temporary i may be incremented by one in a MOD m fashion (step 232) and the process continues until a memory location is available and an i parameter is assigned to the incoming packet.

Alternatively, in other embodiments, a new variable may be used to keep track of available first memory module to store an incoming packet, denoted by first available slot, FAS. Once FAS is set to the $i^{th}$ memory module, via, for example, a counter or a register, the value of the FAS may not change during the search for the parameter i for an incoming packet. The FAS may be used in instances where available memory slots on different memory modules are pre-assigned to previous packets. Therefore, using the tracking of a first available slot, assignment may be made when a first available slot in a given OSV is available without having to perform a new search.

In some embodiments, a counter may be used with the FAS value to determine an available memory slot. The counter may be increased by 1 when a current memory module is pre-assigned and/or when a current memory slot holds valid packet. The value of the counter may be compared to m to determine if all the memory modules have been searched to find available memory slot in a given OSV j. If counter has reached the value of m, then the value of the counter will be assigned to parameter i.

Figure 2D:
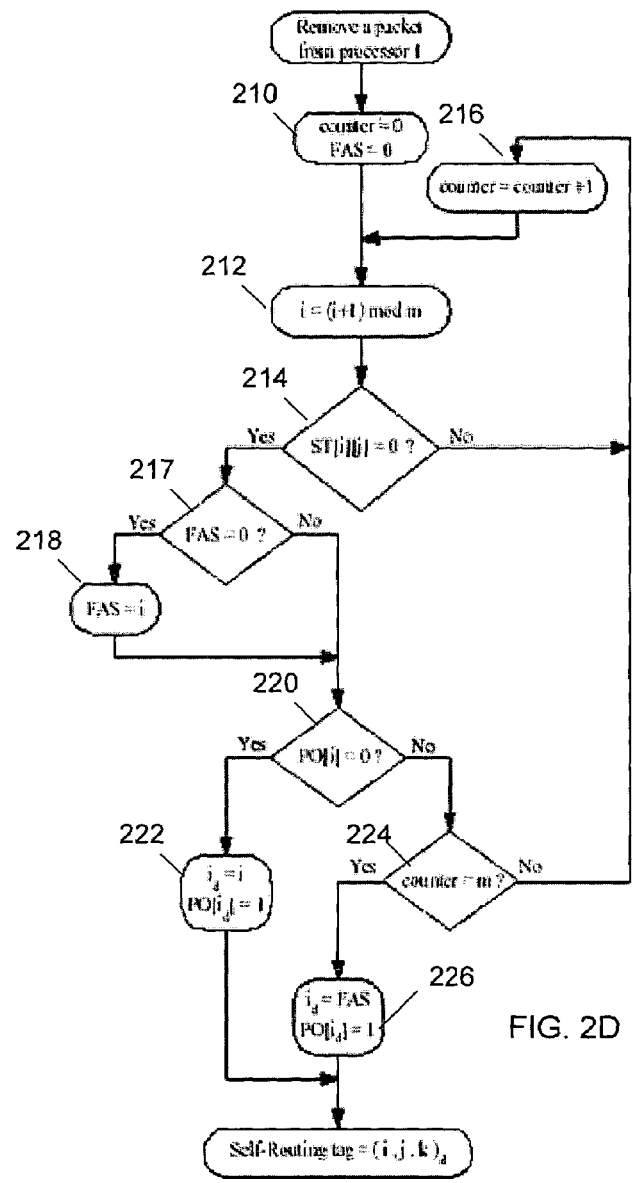

In other embodiments, a PO[i] array may be used to store indicators of pre-occupied memory modules in a given cycle. If the value of PO[i] is equal to 1, the $i^{th}$ memory module may be pre-assigned by previous packets in a given cycle. Similarly, if the value of PO[i] is equal to zero, the $i^{th}$ memory module may not have been assigned by previous packets in a given cycle. As such, when an incoming packet is received from a first processor, the FAS and counter variables may be set to zero, as shown in step 210 of FIG. 2D. The last i value assigned to a previous packet in the scan table may be increased by 1 in MOD m fashion.

Next, the value of ST(i,j) is compared with zero (step 212). If the ST(i,j) is not equal to zero, then the $j^{th}$ location of the $i^{th}$ memory module holds a valid packet whose scan-plane value is k (step 214). The counter will be increased by 1 and i value will be increased by 1 in MOD m fashion and compare to the value of ST(i,j) until the $j^{th}$ location of the $i^{th}$ memory module in the memory space is empty (steps 216). If an empty space is found, a comparison step may be performed. Alternatively, if ST(i,j) equals to zero, the $j^{th}$ location of the $i^{th}$ memory module in the global memory space is empty and does not hold a valid packet. As such, the corresponding i value for the empty space may be assigned to FAS if FAS is equal to 0 (steps 217 and 218). Once FAS is assigned to i value, the value may not change. Next, a comparison to the PO[i] value will be performed in order to determine if the current slot was pre-assigned by previous packets in a given cycle (step 220). If the PO[i] value is equal to zero, then the $j^{th}$ location of the $i^{th}$ memory module in the global memory space is empty and does not hold a valid packet and was not pre-assigned. As such, the i parameter along with j, and k parameters, making up the self-routing tag (i, j, k) is assigned to the incoming packet (step 222).

Similarly, if the PO[i] value is equal to 1 (e.g., the slot was pre-assigned), then the counter may be examined to determine if all memory modules have been searched (step 224). If the counter value is equal to m, then the i parameter may be assigned to FAS (step 226). If the counter value is less than m, a search for i parameter may continue until empty space is found (return to step 216).

The determination of the i parameter may be done when an incoming packet is provided by a first processor to a second processor in a two processor scheme. In some embodiments of the present disclosure, the second processor may include a counter for performing the MOD m operation. Further, a cache of the second processor may store the ST(i,j) and PO[i] values such that the individual values may be moved from the cache and provided for comparison to determine if the values equal to zero. The comparison may be done by a comparator of the second processor. Additionally, the second processor may include general purpose registers for the FAS and counter of the embodiment.

Alternatively, the determination of the i parameter may be implemented using a software program. The software based components may determine the FAS and also determine the value of the counter. As such the above the parameter assignment scheme of FIGS. 2B-2D may be implemented in hardware and/or software.

Figure 3:
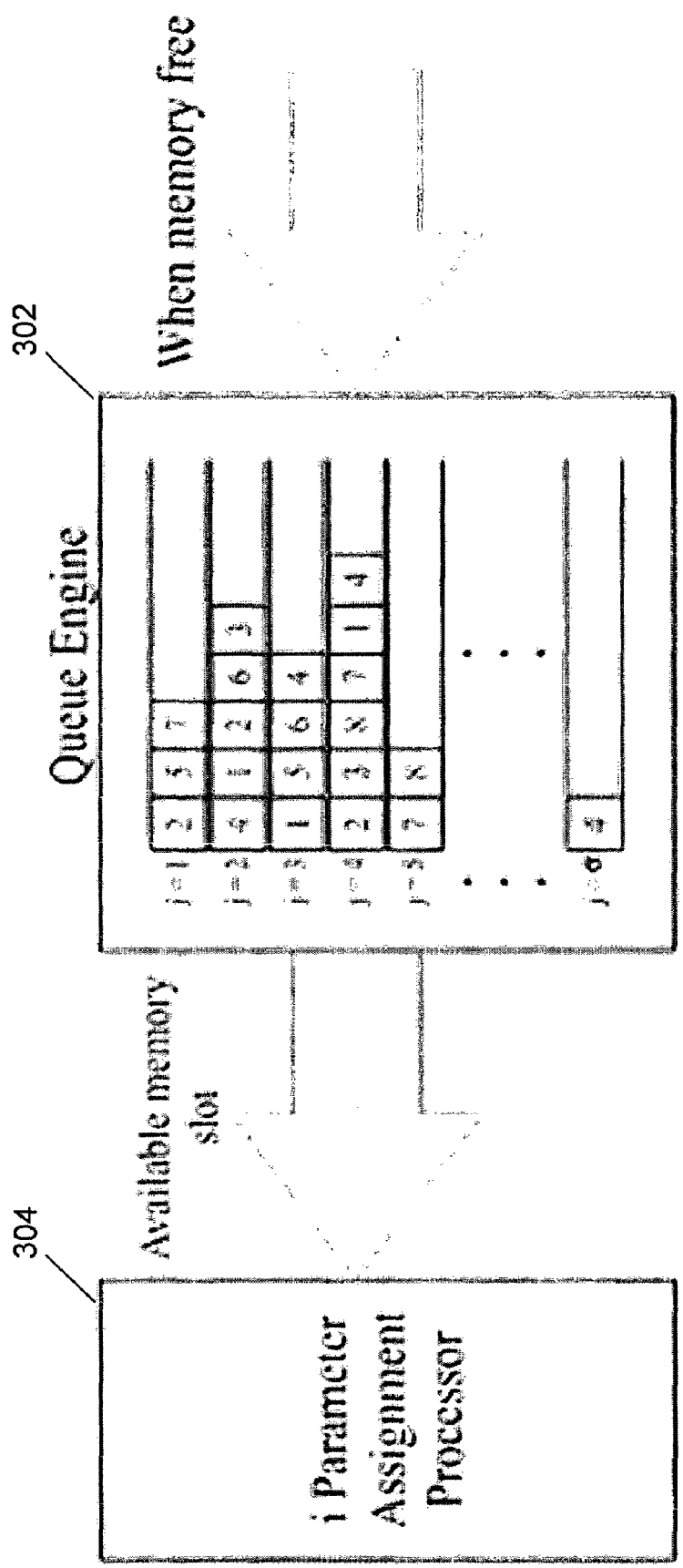
FIG. 3 shows a flow chart showing steps of a method for assigning a parameter, according to embodiments of the invention.

In other embodiments, the parameter i may be determined using a queue as shown in FIG. 3. The queue based assignment scheme may begin with the initialization of queues where any available memory location may be added to queue engine 302. After initialization, an i parameter from the queues may be assigned to the incoming packets by PAC 304. Additionally, when a packet stored in $i^{th}$ memory module is sent out to output interconnection network (e.g., output interconnection network of a sliding-window switching system), the i parameter assigned to the outgoing packet may be added at the end of the corresponding queue(j) such that (i, j) memory module slot is available for next incoming packets.

The queue-based assignment scheme may not perform any search to assign i parameter for incoming packet. All available i values for each OSV j may have been queued in queue engine 302. As such, in one embodiment, the number of queues may equal to number of memory locations.

It is noted that the above disclosure of the assignment methods may be used with other sharable parallel memory module based switch architecture. For example, architecture that implements a centralized controller, such as U.S. Pat. No. 5,649,217, incorporated herein by reference, can implement the techniques for assigning memory modules to incoming packets as described in the present disclosure. Alternatively, architectures that do not elect to implement a centralize controller function, e.g., a sliding window switch architecture, can implement the techniques for assigning memory modules to incoming packets as described in the present disclosure.

EXAMPLES

The following examples are included to demonstrate specific embodiments of this disclosure. It should be appreciated by those of skill in the art that the techniques disclosed in the examples that follow represent techniques discovered by the inventor to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention Example 1

Memory Bandwidth of a Sliding Window Switch

As noted above, the parameter i denotes the memory module where an incoming packet is stored. The parameter assignment circuit first determines the j and k parameters and uses the j and k values to determine the value of $i^{th}$ parameter, for example, the memory module (i) where an incoming packet is stored. If packets, arriving in a given input cycle, are assigned to different memory modules then it is possible for all the incoming packets belonging to that cycle to be stored in parallel to different memory modules requiring just one memory cycles. However, due to different traffic patterns and distribution of output destinations among the incoming packets, it is possible that some of the incoming packets in a given cycle may not be assigned to different memory modules. This will require the packets of an input cycle to be stored in memory modules in more than one memory cycle and hence increasing the memory bandwidth. The memory bandwidth for the sliding-window switch is defined as the number of memory WRITE cycles needed to store incoming packets in an input cycle. In this example, the average memory bandwidth of a given sliding-window packet switch and its performance under traffic with varying burstiness is measured.

The number of memory-write cycles needed in an input cycle can be determined by the maximum number of packets assigned to one memory module. If there is no memory conflict and if all incoming packets assigned to different parallel memory modules, the memory bandwidth would be 1. If there are some memory conflicts, such as having some incoming packets assigned to same memory module, the memory bandwidth would be greater than 1 because there will be more than one memory-write cycles needed.

Figure 4:
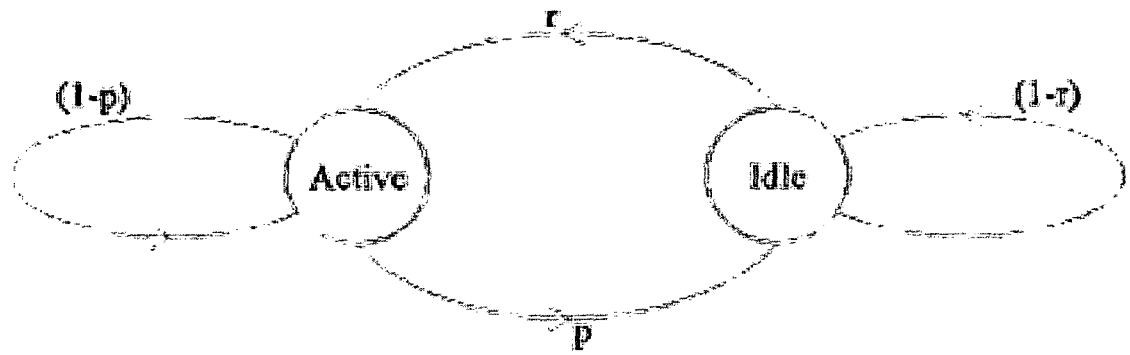
FIG. 4 shows a state chart, according to embodiments of the invention.

To study performance of memory-bandwidth for the switching system, a bursty traffic is generated using a two state ON-OFF model, i.e., by alternating a geometrically distributed period during which no arrivals occur (idle period), by a geometrically distributed period during which arrivals occur (active period) in a Bernoulli fashion and vice versa as shown in FIG. 4. If p and r characterize the duration of the active and idle period respectively, then the probability that the active period lasts for i time slots is given by $$P(i)=p(1-p)^{i-1} \text{ for } i \geq 1 \qquad \text{Eq. (1)}$$

and the corresponding average burst length is given by $$E_B[i]=1/P \qquad \text{Eq. (2)}$$

Similarly, the probability that the idle period lasts for j time slots is given by $$R(j)=r(1-r)^j \text{ for } j \geq 0 \qquad \text{Eq. (3)}$$

and corresponding the mean idle period is given by $$E_I[j]=(1-r)/r \qquad \text{Eq. (4)}$$

Hence, for a given p and r, the offered load L is given by $$L=EB[i]/(EB[i]+EI[j])=r/(r+p-r.p) \qquad \text{Eq. (5)}$$

The measurements of interest considered in this example are the offered load for a bursty traffic of a given average burst length (ABL) and memory bandwidth of the memory modules required to store incoming packets for switching purposes. The simulation experiments started with empty memory modules and the incoming bursts of packet were uniformly distributed to all the outputs. The switch size considered for the sliding-window switch for this example was 4×4 and 8×8 in order to have more a diverse result. Depending on the offered load, first a maximum of 4×106 packets were generated for evaluation of the memory-bandwidth of the switch. Then a number of generated packets was increased depending on the different switch sizes. Three different types of bursty traffic were generated. The first bursty traffic had an average burst length (ABL) of 8 packets, the second bursty traffic had an ABL of 16 packets, and the third bursty traffic had an ABL of 32 packets, where for each scenario, the number of scan-length, s, was 16 and the number of scan-planes, p, equals 2. Different numbers of memory modules (m) are deployed for the example, e.g., first m=6 modules (m=2N−2), second m=8 modules (m=2N), and the rest depends on the switch size.

Figure 5:
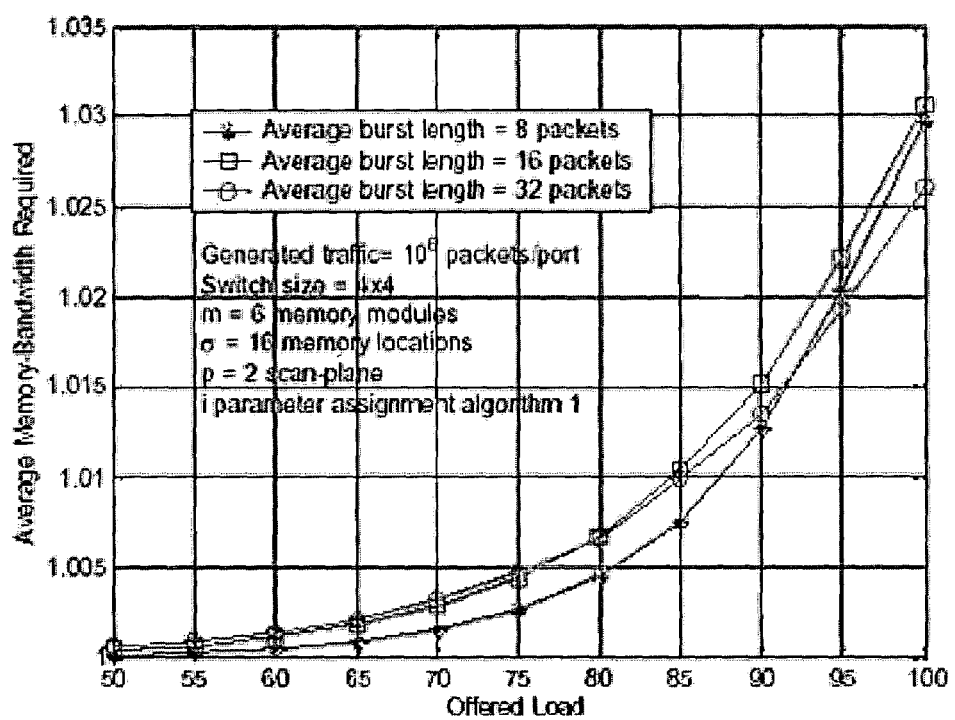
FIG. 5 shows a plot of an average memory-bandwidth required versus offered load, according to embodiments of the invention.
Figure 6:
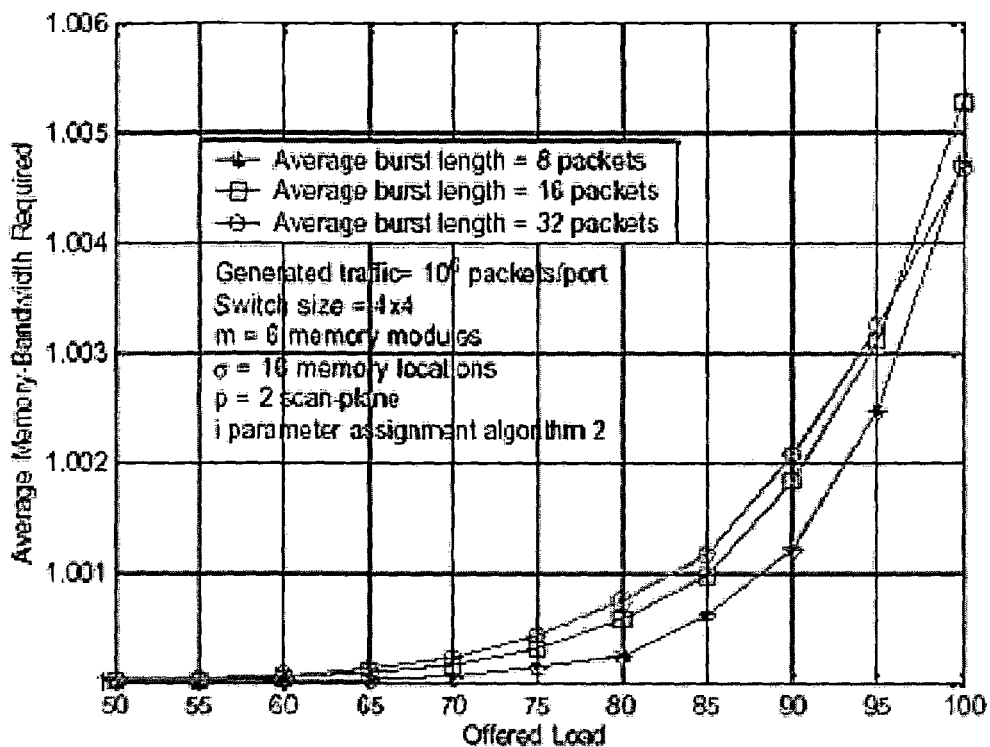
FIG. 6 shows a plot of an average memory-bandwidth required versus offered load, according to embodiments of the invention.

The plot shown in FIG. 5 is the simulated average memory-bandwidth required versus offered load using a parameter assignment scheme of the present invention and the three different types of bursty traffic. In the simulation, it is seen that multiple packets stored in one memory module required faster memory-write compared to line speed. It is possible that 3 packets (worst case) can be stored in one memory module shown in Table 1. As such, memory-write speed has to be at least 3 times faster than the line speed so that 3 packets can be written in one write cycle. The effect of different burstiness (8, 16, 32 packets) on average memory bandwidth required versus offered load is depicted when 8 memory modules deployed to the sliding window switch in FIG. 6. It is also possible that 3 packets (worst case) can be stored in one memory module shown in Table 2. That means memory-write speed has to be at least 3 times faster than the line speed so that 3 packets can be written in one write cycle. It is observed that average memory bandwidth requirements in FIGS. 5 and 6 are almost the same up to 85% load. When the load is higher than 85%, the average memory bandwidth differentiated in FIG. 6. This can be explained by the way packets are stored in parallel memory modules of the switch.

TABLE 1

Worst Case Scenario of Multiple Packets Assigned to
the Same Memory Module at 100% load in FIG. 5

| Average Burst Length | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 8 packets | $7.8 \times 10^{-3}$ | 0 | 0 | 0 |
| 16 packets | $7.7 \times 10^{-3}$ | $5 \times 10^{-7}$ | 0 | 0 |
| 32 packets | $6.7 \times 10^{-3}$ | $2.5 \times 10^{-7}$ | 0 | 0 |

TABLE 2

Worst Case Scenario of Multiple Packets Assigned to
the Same Memory Module at 100% load in FIG. 6

| Average Burst Length | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 8 packets | $1.2 \times 10^{-2}$ | $1 \times 10^{-6}$ | 0 | 0 |
| 16 packets | $8.5 \times 10^{-3}$ | $2.5 \times 10^{-7}$ | 0 | 0 |
| 32 packets | $6 \times 10^{-3}$ | 0 | 0 | 0 |

Traffic with higher burstiness brings longer burst of packets all destined to same output port. The self-routing parameter assignment scheme of the present invention (e.g., FIG. 2A) assigns successive OSVs for successive packets of an output queue. Furthermore, the assignment for parameter i for packets of an input cycle is such that they are allocated to different memory modules. This causes the packets in longer bursts to be stored diagonally on a two-dimensional scan-plane in the memory space of switching system. This is true with the packets belonging the smaller bursts. However diagonal storage footprint will be much smaller than the traffic with higher burst length. The diagonal storage of packets can be done more readily in parallel, requiring only one memory cycle. Hence, the traffic with higher burstiness produces larger diagonal storage-footprints that mostly require only one memory cycle for packets arriving in one cycle, and hence requiring smaller average memory bandwidth.

Traffic with smaller burstiness has more occurrences of patterns that do not have diagonal storage-footprints. This is because the smaller bursts of packets brought in successive cycles are more likely to belong to different output-ports and many of which will be required to be stored in the current OSV or near current OSV. This will cause assignment of multiple packets arriving in the same cycle to acquire slots in the same memory module and thus increasing the average memory-bandwidth for traffic with lower burstiness.

Figure 7:
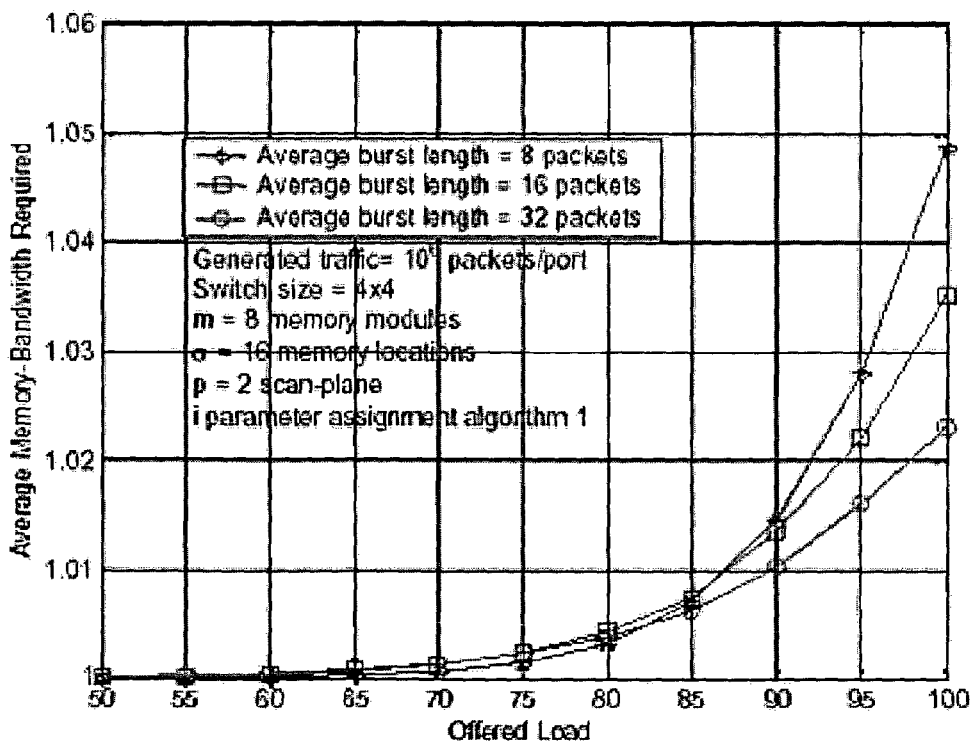
FIG. 7 shows a plot of an average memory-bandwidth required versus offered load, according to embodiments of the invention.

Simulation of average memory-bandwidth required versus offered load using a parameter assignment scheme of the present disclosure (e.g., FIGS. 2B-2D) is shown in FIG. 7. The average memory bandwidth of the sliding-window switch has decreased for different burstiness using the parameter assignment scheme of the present invention (e.g., FIGS. 2B-2D). This is due to the impact of pre-assigned (pre-occupied) memory modules and using them to minimize the average memory bandwidth. Further, FIG. 7 shows both average memory-bandwidth requirement and memory-write speed. It is experienced that 2 packets can be assigned in one memory module in one input cycle shown in Table 3. The assignment of 2 packets in one memory means memory-write speed has to be 2 times faster than the line speed.

TABLE 3

Worst Case Scenario of Multiple Packets Assigned to
the Same Memory Module at 100% load in FIG. 7

| Average Burst Length | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 8 packets | $1.2 \times 10^{-3}$ | 0 | 0 | 0 |
| 16 packets | $1.3 \times 10^{-3}$ | 0 | 0 | 0 |
| 32 packets | $1.3 \times 10^{-3}$ | 0 | 0 | 0 |

Figure 8:
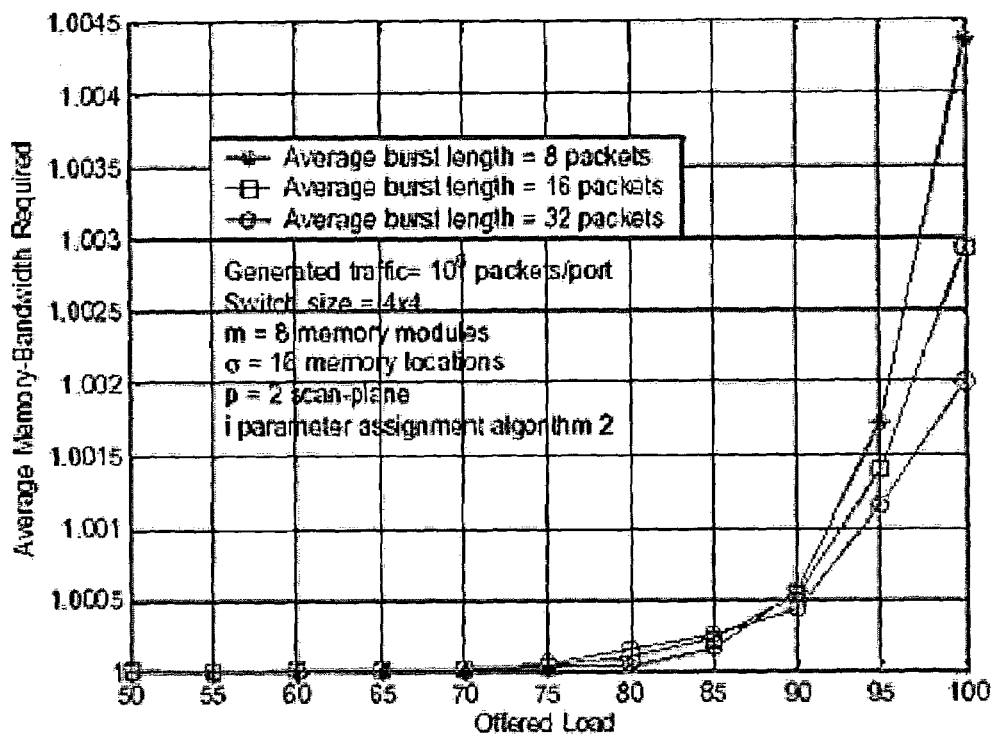
FIG. 8 shows a plot of an average memory-bandwidth required versus offered load, according to embodiments of the present invention.

Higher average memory-bandwidth for traffic with lower burstiness is shown in FIG. 8, where the number of memory modules is 8. Table 4 shows frequencies of multiple packets stored in one memory module at 100% load traffic using parameter assignment schemes of the present invention (e.g., FIGS. 2B-2D).

TABLE 4

Worst Case Scenario of Multiple Packets Assigned to
the Same Memory Module at 100% load in FIG. 8

| Average Burst Length | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 8 packets | $1.1 \times 10^{-3}$ | 0 | 0 | 0 |
| 16 packets | $7.3 \times 10^{-4}$ | 0 | 0 | 0 |
| 32 packets | $5 \times 10^{-4}$ | 0 | 0 | 0 |

Figure 9:
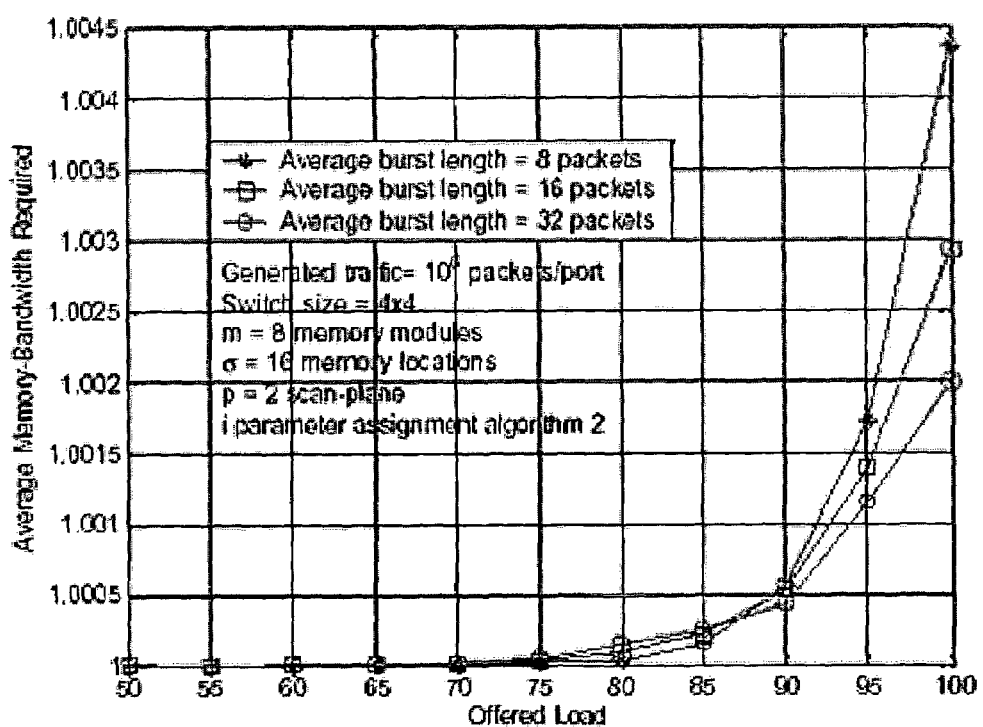
FIG. 9 shows a plot of an average memory-bandwidth required versus offered load, according to embodiments of the present invention.

The simulation of average memory-bandwidth required versus offered load using parameter assignment scheme of the present invention (e.g., FIG. 3) is shown in FIG. 9. Table 5 shows that frequencies of having multiple packets assigned in one memory module parameter assignment scheme of the present invention (e.g., FIG. 3). It is experienced that 4 packets can be assigned in one memory module in one input cycle shown in Table 5. The assignment of 4 packets in one memory requires 4 times faster memory-write speed than the line speed.

TABLE 5

Worst Case Scenario of Multiple Packets Assigned to
the Same Memory Module at 100% load in FIG. 9

| Average Burst Length | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 8 packets | $1.13 \times 10^{-1}$ | $1.6 \times 10^{-2}$ | $9.4 \times 10^{-4}$ | 0 |
| 16 packets | $1.1 \times 10^{-1}$ | $1.2 \times 10^{-2}$ | $6.1 \times 10^{-4}$ | 0 |
| 32 packets | $8.4 \times 10^{-1}$ | $7.9 \times 10^{-3}$ | $2.9 \times 10^{-4}$ | 0 |

Example 2

Different Switch Size on Memory Bandwidth Requirement

Figure 10:
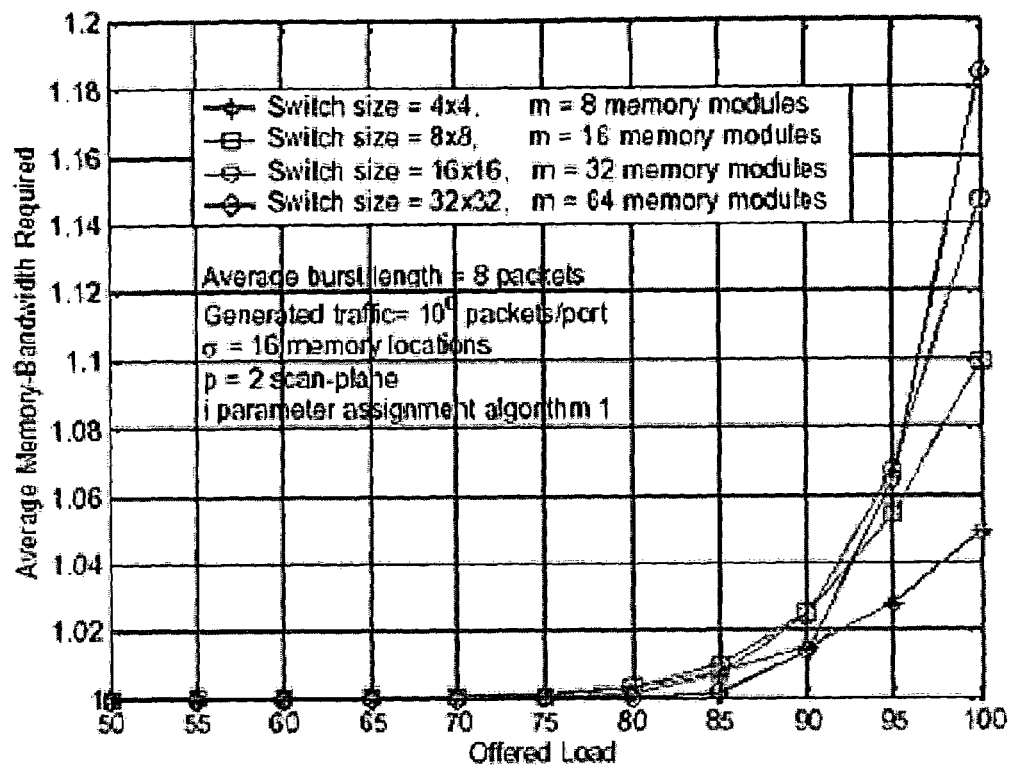
FIG. 10 shows a plot of an average memory-bandwidth required versus offered load, according to embodiments of the present invention.

In this example, parameter assignment scheme of the present invention (e.g., FIG. 2A) is used to measure the effects of switch size on memory bandwidth performance of Parameter Assignment Circuit. Switch sizes including 4×4, 8×8, 16×16, and 32×32 were used, where 8, 16, 32, and 64 memory modules (m=2N) are deployed respectively to maximize full utilization. Average burst length is set to 8 packets to observe the maximum number of memory conflicts (8 packets of average burst length has more memory conflicts than 16 and 32 packets of average burst length). FIG. 10 shows that increase in switch size resulted in an increase of the memory bandwidth requirement at higher load traffic. Table 6 shows that increase in switch size resulted in an increase of frequency of assigning multiple packets in one memory module. However, increase in switch size does not affect memory-write speed. According to the Table 6, memory-write speed must be 3 times faster than the line speed in order to write 3 packets in one memory module.

TABLE 6

Worst Case Scenario of Multiple Packets Assigned to the Same Memory Module at 100% load in FIG. 10

| Switch Size | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 4 × 4 | $1.2 \times 10^{-2}$ | $1.3 \times 10^{-6}$ | 0 | 0 |
| 8 × 8 | $1.5 \times 10^{-2}$ | $8 \times 10^{-6}$ | 0 | 0 |
| 16 × 16 | $1.4 \times 10^{-2}$ | $6.8 \times 10^{-6}$ | 0 | 0 |
| 32 × 32 | $1.2 \times 10^{-2}$ | $1.9 \times 10^{-6}$ | 0 | 0 |

Figure 11:
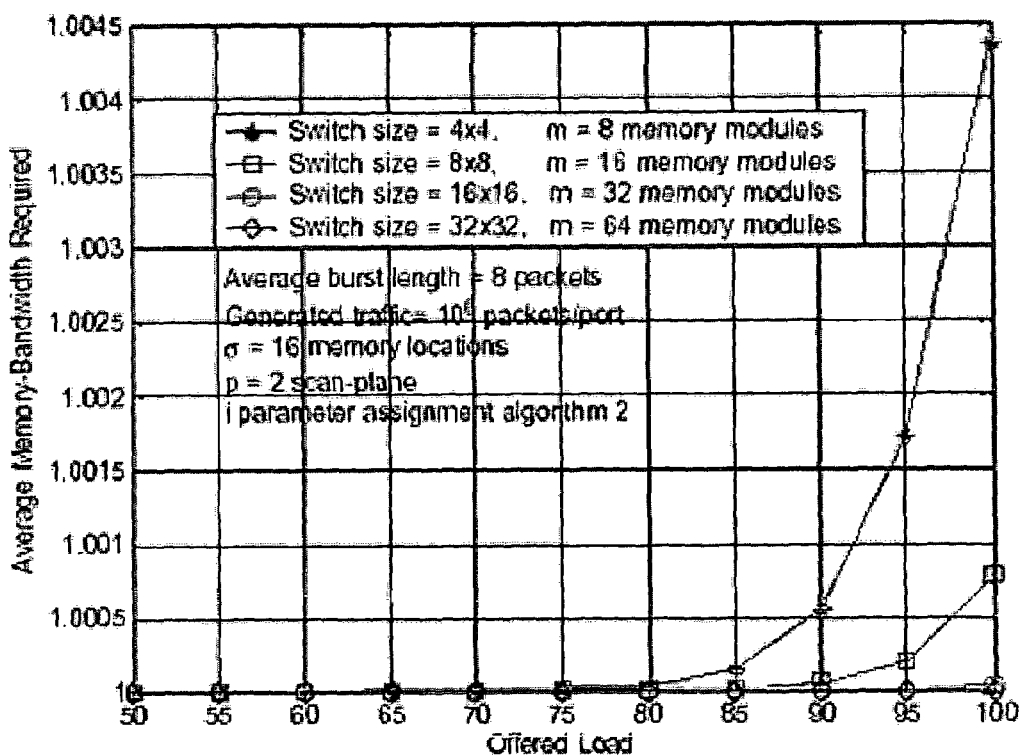
FIG. 11 shows a plot of an average memory-bandwidth required versus offered load, according to embodiments of the present invention.

Parameter assignment scheme of the present invention (e.g., FIGS. 2B-2D) was simulated for 4×4, 8×8, 16×16, and 32×32 switch size, where 8, 16, 32, and 64 memory modules (m=2N) are deployed respectively to maximize full utilization. Average burst length is set to 8 packets to observe the maximum number of memory conflicts (8 packets of average burst length has more memory conflicts than 16 and 32 packets of average burst length). FIG. 11 shows that an increase in switch size resulted in the reduction of the memory bandwidth requirement at higher load traffic. Table 7 shows that an increase in switch size reduces the frequency of assigning multiple packets in one memory module. Increasing the switch size to 32×32 with 64 memory modules has completely eliminated all memory conflicts. The average memory bandwidth requirement becomes 1 which means all incoming packets in each input cycle are stored in one memory-write cycle.

TABLE 7

Worst Case Scenario of Multiple Packets Assigned to the Same Memory Module at 100% load in FIG. 11

| Switch Size | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 4 × 4 | $1.1 \times 10^{-3}$ | 0 | 0 | 0 |
| 8 × 8 | $8.7 \times 10^{-5}$ | 0 | 0 | 0 |
| 16 × 16 | $2.7 \times 10^{-6}$ | 0 | 0 | 0 |
| 32 × 32 | 0 | 0 | 0 | 0 |

Figure 12:
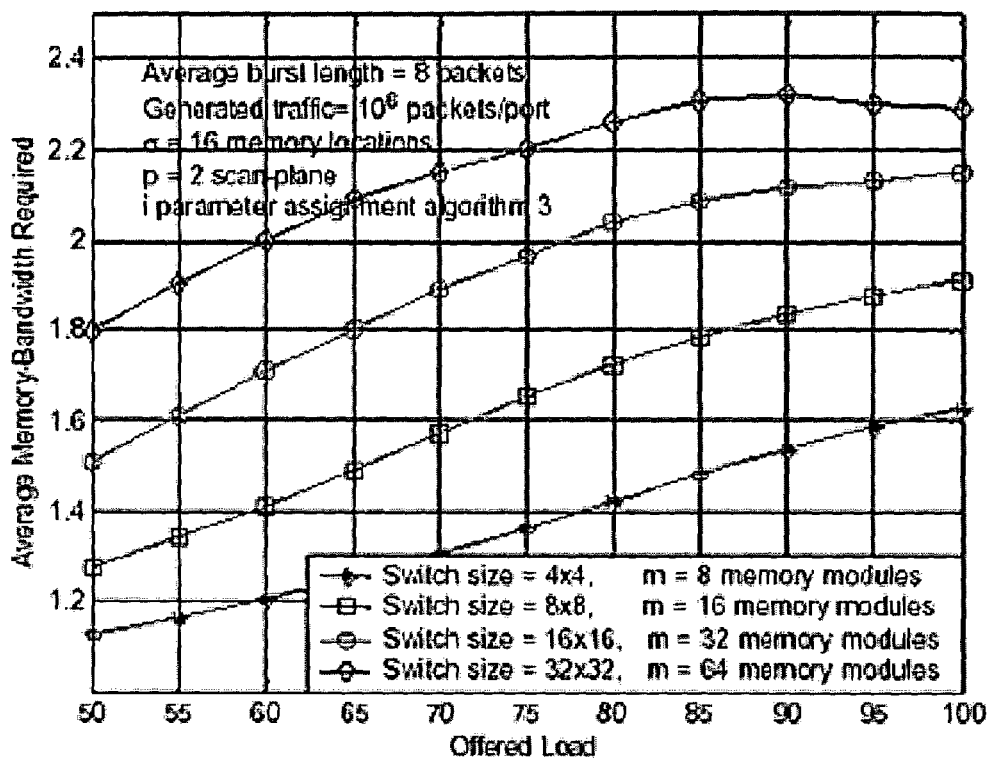
FIG. 12 shows a plot of an average memory-bandwidth required versus offered load, according to embodiments of the present invention.

Parameter assignment scheme of the present invention (e.g., FIG. 3) was also simulated for 4×4, 8×8, 16×16, and 32×32 switch size, where 8, 16, 32, and 64 memory modules (m=2N) are deployed respectively to maximize full utilization. Average burst length is set to 8 packets to observe the maximum number of memory conflicts (8 packets of average burst length has more memory conflicts than 16 and 32 packets of average burst length). FIG. 12 shows that an increase in switch size results in an increase of the memory bandwidth requirement at higher load traffic. Table 8 shows that increase in switch size result not only increased the frequency of assigning multiple packets in one memory module but also increase in memory-write speed. According to the Table 8, memory write speed must be 4 times faster than the line speed in order to write 4 packets in one memory module when switch size is 4×4, 6 times faster than the line speed in order to write 6 packets in one memory module when switch size is 8×8, 7 times faster than the line speed in order to write 7 packets in one memory module when switch size is 16×16, and 8 times faster than the line speed in order to write 8 packets in one memory module when switch size is 32×32.

TABLE 8

Worst Case Scenario of Multiple Packets Assigned to the Same Memory Module at 100% load in FIG. 11

| Ratio of multiple packets stored in 1 memory module | Switch Size 4 × 4 | Switch Size 8 × 8 | Switch Size 16 × 16 | Switch Size 32 × 32 |
|---|---|---|---|---|
| 2 packets | $1.3 \times 10^{-1}$ | $1.2 \times 10^{-1}$ | $1.1 \times 10^{-1}$ | $9.9 \times 10^{-2}$ |
| 3 packets | $1.6 \times 10^{-2}$ | $1.6 \times 10^{-2}$ | $1.3 \times 10^{-2}$ | $9.5 \times 10^{-3}$ |
| 4 packets | $9.3 \times 10^{-4}$ | $1.5 \times 10^{-3}$ | $1.2 \times 10^{-3}$ | $7.5 \times 10^{-4}$ |
| 5 packets | 0 | $9.8 \times 10^{-5}$ | $8.4 \times 10^{-5}$ | $4.5 \times 10^{-5}$ |
| 6 packets | 0 | $4.3 \times 10^{-6}$ | $5.3 \times 10^{-6}$ | $2.9 \times 10^{-6}$ |
| 7 packets | 0 | $1.3 \times 10^{-7}$ | $5 \times 10^{-7}$ | $1.9 \times 10^{-7}$ |
| 8 packets | 0 | 0 | 0 | $1.9 \times 10^{-7}$ |
| 9 packets | 0 | 0 | 0 | $2.1 \times 10^{-8}$ |

As seen in Table 8, the larger switch size generates more packets, which increases the probability of assigning multiple packets in one memory module.

Example 3

Effect of the Number of Packet Locations, s, on Switch Performance

Parameter assignment schemes of the present invention (e.g., FIGS. 2B-2D) are used to measure the effects of the number of memory locations and different offered load on average memory bandwidth performances of a PAC.

Figure 13:
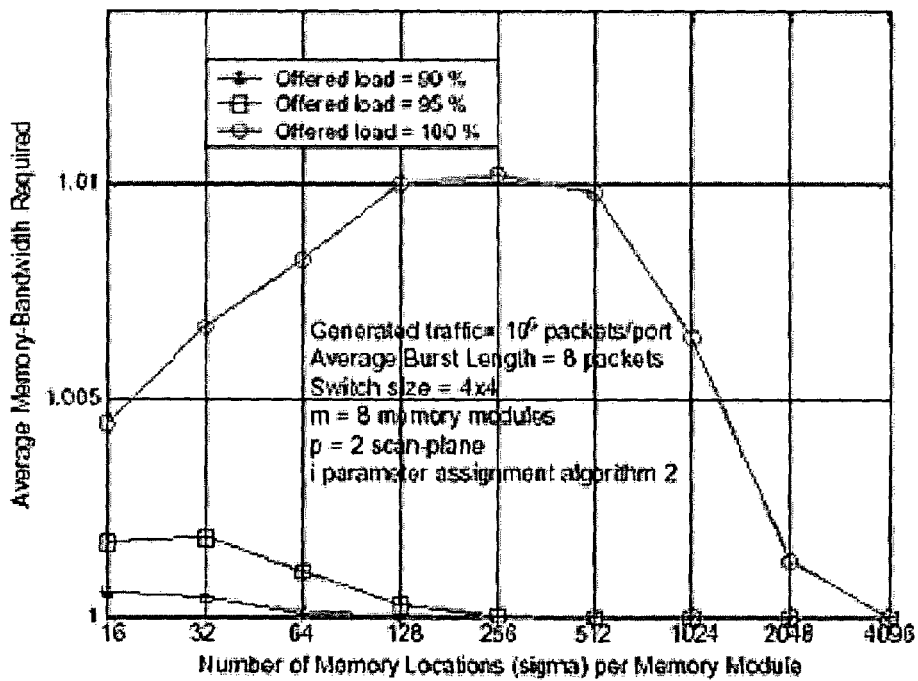
FIG. 13 shows a plot of an average memory-bandwidth required versus a number of packet locations per memory module, according to embodiments of the present invention.

The scheme is simulated where the switch size is set to 4×4 and where 8 memory modules (m=2N) are deployed to maximize full utilization. The average burst length is set to 8 packets to observe the maximum number of memory conflicts (8 packets of average burst length has more memory conflicts than 16 and 32 packets of average burst length), load offered were 90%, 95%, and 100% because these load values give us the worst 3 cases. Simulation started with s=16 and doubled at each iteration to reach 4096 locations in each memory modules. FIG. 13 shows that the average memory bandwidth requirement is a maximum when the traffic load=100% and s=256. The average memory bandwidth requirement is 1 when traffic load=90% and s=256, when traffic load=95% and s=512, and when traffic load=100% and s=4096.

Table 9 shows that memory-write speed can be a maximum of 2 times faster than the line speed in order to write 2 packets in one memory module when the traffic load=100% and s=256. However, if there is load is more balanced, traffic load can be adjusted. For example, a 90% memory-write speed could be the same as line speed when the traffic=90% and s=256 because there is no memory conflict at 90% traffic load and s=256, as shown in the first row in Table 9.

TABLE 9

Worst Case Scenario of Multiple Packets Assigned to the Same Memory Module s = 256 in FIG. 13

| Offered Load at s = 256 | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 90% | 0 | 0 | 0 | 0 |
| 95% | $1.3 \times 10^{-6}$ | 0 | 0 | 0 |
| 100% | $2.8 \times 10^{-3}$ | 0 | 0 | 0 |

Figure 14:
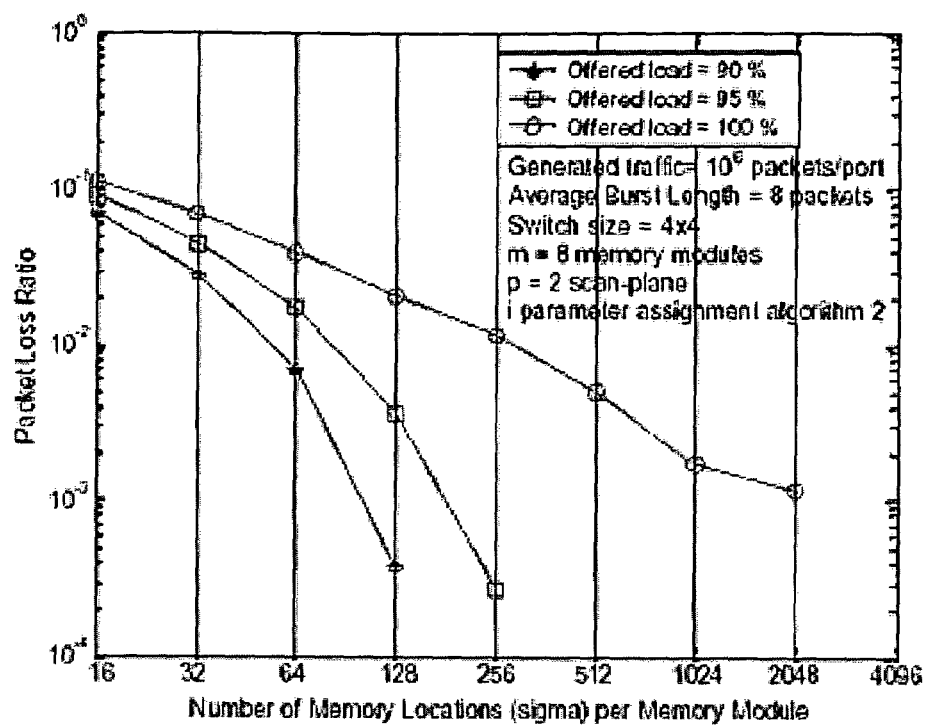
FIG. 14 shows a plot of packet loss ratio versus a number of packet locations per memory module, according to embodiments of the present invention.

The larger the value for s, the larger the queue size for each output-port. Memory conflicts occur mostly when all the output queues are greater than s because when the number of packets in each queue exceeds the s, two packets will be stored in the current OSV whose queues are greater than s. Therefore, the number of available slot will decrease one or two depending on the switch size. Memory conflicts will occur when there is small number of available slot in the current OSV. In instances where the number of available slot is one, the incoming packet will be stored in that available slot in that OSV leaving no deciding mechanism. The number packets at each queue can reach up to 256 rapidly when sigma is 256, which has the maximum average memory bandwidth requirement, as shown in FIG. 14. The high value for s will increase the queue for each output-port. The probability of having more than the number of s (s is greater than 256) packets on the each queue is going to be declined until s=4096. When s=2048, there is still small amount of packet loss indicating some of the output queues can reach the 4096 packets at 100% load having average 8 packets burst length shown in FIG. 15. The packet loss ratio is zero and the average memory bandwidth requirement is 1 when s=4096.

Figure 16:
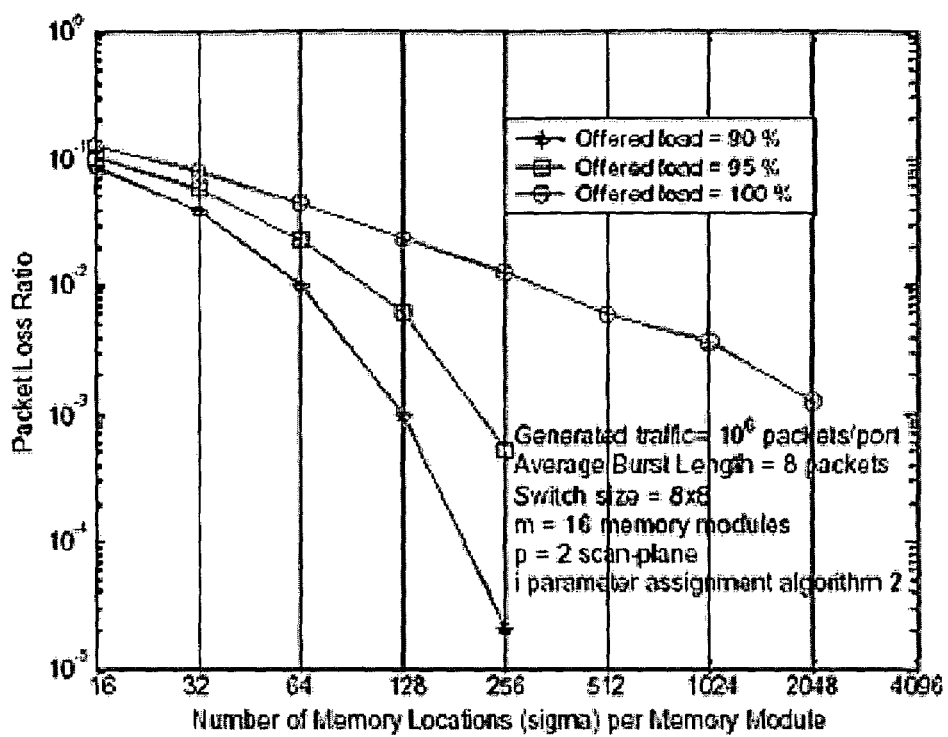
FIG. 16 shows a plot of packet loss ratio versus a number of packet locations per memory module, according to embodiments of the present invention.

The parameter switching scheme of the present invention (e.g., FIGS. 2B-2D) is simulated where the switch size is set to 8×8 and where 16 memory modules are deployed to maximize full utilization. The average burst length is set to 8 packets to observe the maximum number of memory, load offered were 90%, 95%, and 100% because these load values provides the worst 3 cases. Simulation started with s=16 and doubled each increment up to 4096 locations in each memory modules. FIG. 16 shows that average memory bandwidth requirement is a maximum when the traffic load=100% and s=256. The average memory bandwidth requirement is 1 when traffic load=90% and s=256, when traffic load=95% and s=512, and when traffic load=100% and s=4096. Table 10 shows that memory-write speed must be a maximum of 2 times faster than the line speed in order to write 2 packets in one memory module when the traffic load=100% and s=256. The memory-write speed could be the same as the line speed when the traffic at 90% and s=256 because there is no memory conflict at 90% traffic load and s=256.

TABLE 10

Figure 15:
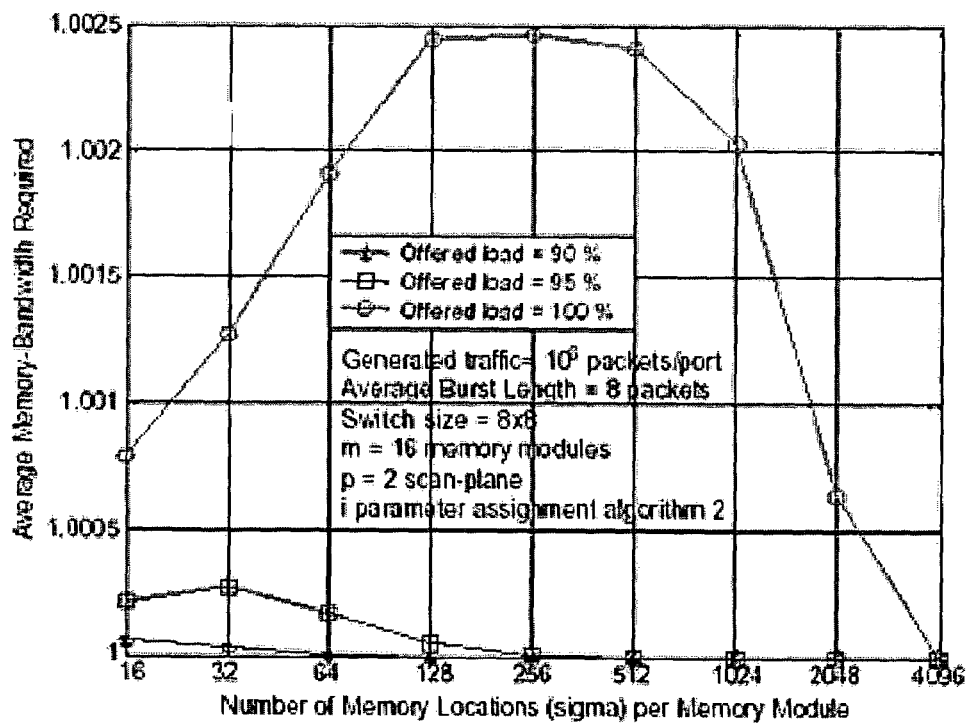
FIG. 15 shows a plot of an average memory-bandwidth required versus a number of packet locations per memory module, according to embodiments of the present invention.

Worst Case Scenario of Multiple Packets Assigned to the Same Memory Module s = 256 in FIG. 15

| Offered Load at s = 256 | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 90% | 0 | 0 | 0 | 0 |
| 95% | $1.3 \times 10^{-7}$ | 0 | 0 | 0 |
| 100% | $3.7 \times 10^{-4}$ | 0 | 0 | 0 |

FIG. 16 shows packet loss ratio versus s per memory module at 8×8 switch with 16 memory modules using i parameter assignment scheme of the present invention. There are packet losses when s=256 at all traffic load values. There is no packet losses when s=512 for 90% and 95% traffic load, s=4096 for 100% traffic load value. Packet loss ratio pattern of 8×8 switch is almost the same as the packet loss ratio pattern of 4×4 switch, where the packet loss ratio is getting higher when switch size is increasing because of increase in number of packets correlated with each switch size. Therefore, the s value usually increases in order to keep certain packet loss ratio.

Figure 17:
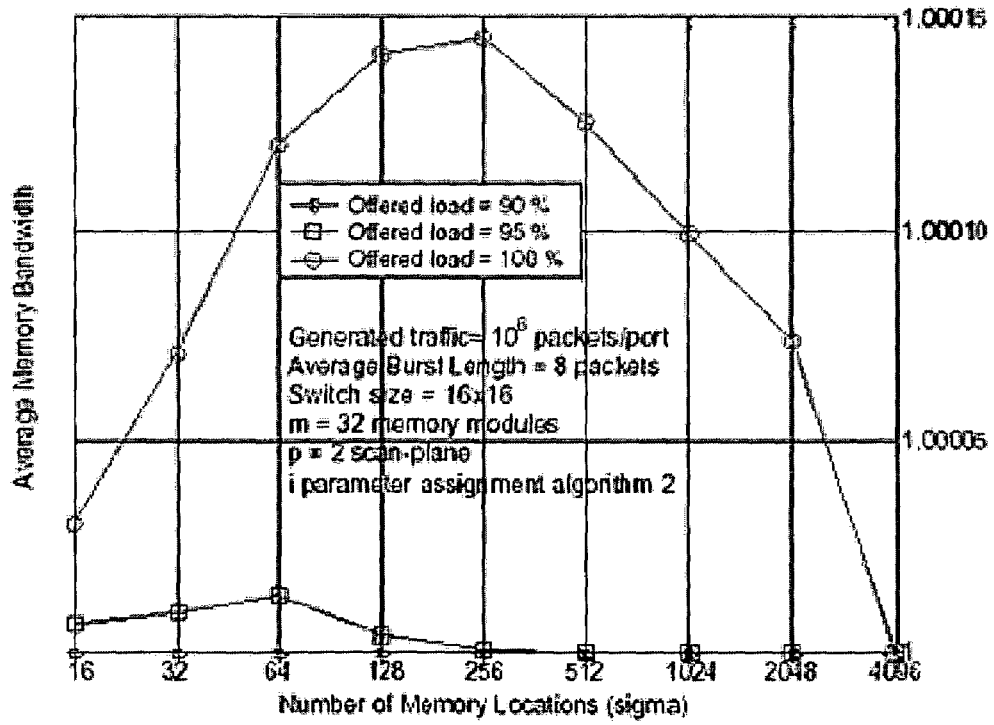
FIG. 17 shows a plot of an average memory-bandwidth required versus a number of packet locations per memory module, according to embodiments of the present invention.

Additionally, the parameter assigning scheme of the present invention is simulated where the switch size is set to 16×16 and where 32 memory modules are deployed to maximize full utilization. The average burst length is set to 8 packets to observe the maximum number of memory. The load offered were 90%, 95%, and 100% because these load values provide the worst three cases. Simulation started with s=16 and doubled each increment up to 4096 locations in each memory modules. FIG. 17 shows that average memory bandwidth requirement is at a maximum when the traffic load=100% and s=256. The average memory bandwidth requirement is 1 when traffic load=90% and all s values, when traffic load=95% and s=256, and when traffic load=100% and s=4096. Table 11 shows that memory-write speed must be a maximum of 2 times faster than the line speed in order to write two packets in one memory module when the traffic load=100 % and s=256. Memory-write speed could be the same as line speed when the traffic load=90%, 95% and s=256 because there is no memory conflict at 90%, 95% traffic load and s=256.

TABLE 11

Worst Case Scenario of Multiple Packets Assigned to the Same Memory Module s = 256 in FIG. 17

| Offered Load at s = 256 | Ratio of 2 packets stored in 1 memory module | Ratio of 3 packets stored in 1 memory module | Ratio of 4 packets stored in 1 memory module | Ratio of 5 packets stored in 1 memory module |
|---|---|---|---|---|
| 90% | 0 | 0 | 0 | 0 |
| 95% | 0 | 0 | 0 | 0 |
| 100% | $1.2 \times 10^{-5}$ | 0 | 0 | 0 |

Figure 18:
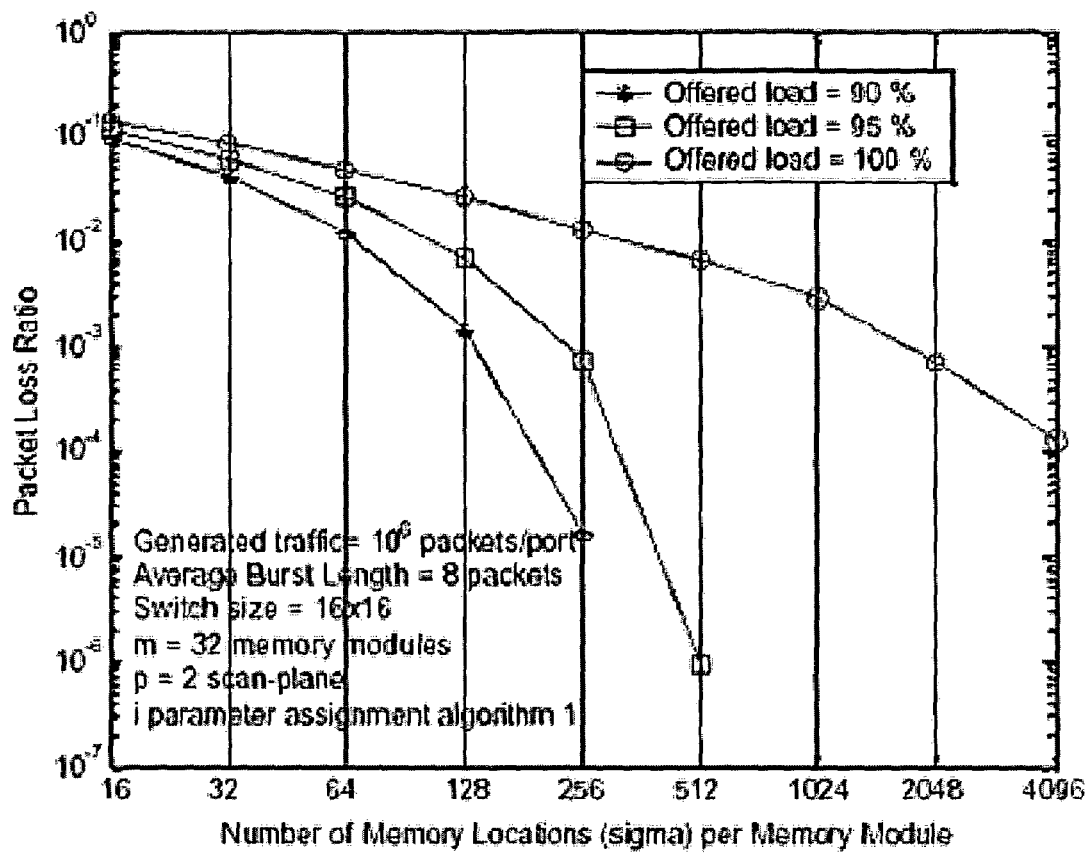
FIG. 18 shows a plot of packet loss ratio versus a number of packet locations per memory module, according to embodiments of the present invention.
Figure 19:
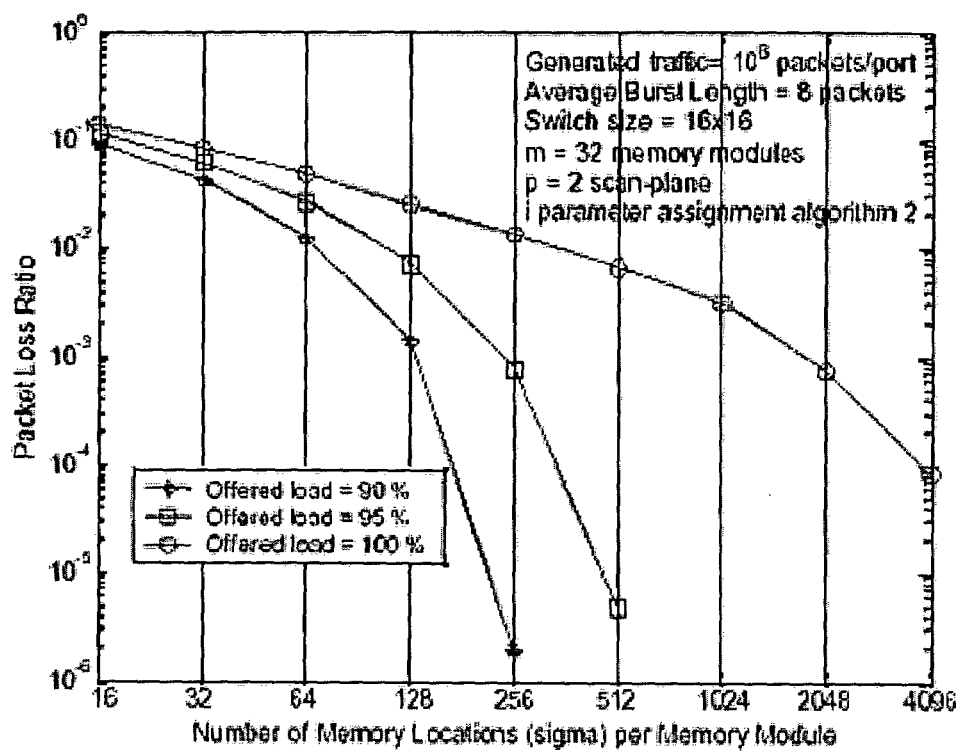
FIG. 19 shows a plot of an average memory-bandwidth required versus offered load, according to embodiments of the present invention.

It is observed that very similar phenomena occurs regarding the average memory bandwidth requirement stabilizes to 1 at 100% load when s is 4096, shown FIG. 17. The only difference between 8×8 and 16×16 switch sizes is that the average memory bandwidth is lower at each s value when 16×16 switch size is deployed. The reason behind the phenomena is due to more memory space and more possibilities to store all incoming packets in parallel, requiring only one memory write cycle. However, the packet loss ratio is increasing while the switch size is increasing (shown in FIG. 18) because the bigger switch size processes more packets than the smaller switch size, causing queues at each output-port to build up rapidly. There is no packet losses when s=512 for 90% traffic load or s=1024 for 95% traffic load value. It is observed that there is small number of packet losses when the s is 4096 (FIG. 19). However, the memory bandwidth requirement stabilizes to 1 (all incoming packets are stored in different memory modules at the given memory cycle) because a very small number of output queue can exceed the s (4096). There will be enough memory slots to store all the incoming packets in different memory modules will decreases the memory bandwidth requirement to 1.

Example 4

Effects of the Number of Scan Planes on Switch Performance

In order to measure effects of a number of scan-planes on memory bandwidth requirement of parameter assignment circuit, the total capacity of global shared memory has to be same amount using the parameter assignment schemes of the present invention. In one example, the parameter assignment scheme (e.g., FIG. 2A) is simulated on 16×16 switch where scan-plane=2, number of memory modules m=32, number of memory locations per memory module s=128, and an average burst length=8 packets. In simulation, the number of memory locations per memory module can be half of previous s size, e.g., from 128 to 64, from 64 to 32, from 32 to 16, while the number of scan planes is doubling from 2 to 4, from 4 to 8, from 8 to 16 respectfully.

Figure 20:
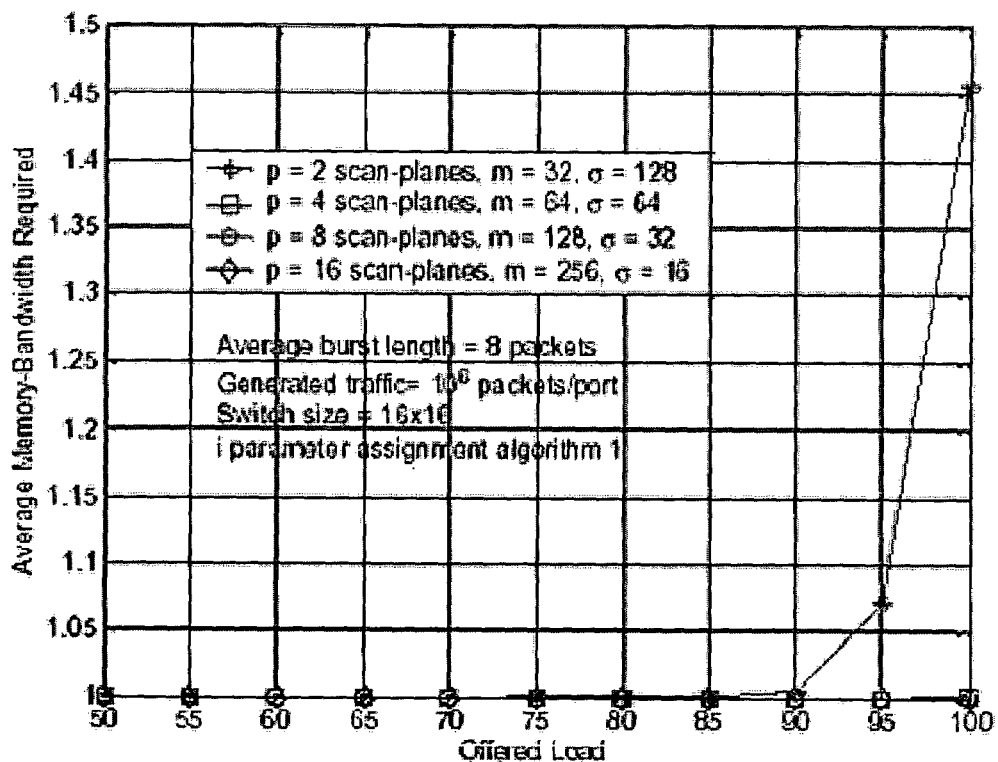
FIG. 20 shows a plot of an average memory-bandwidth required versus offered load, according to embodiments of the present invention.

FIG. 20 shows that average memory bandwidth requirement declined from 1.45 to 1. The number of scan-planes are also increased because of the increase in the number of memory modules caused by the increase in the number of scan-planes. This increase will give enough number of consecutive parallel memory modules that reduce frequency of multiple packets stored in a one memory module. Table 12 shows that memory-write speed must be a maximum of 3 times faster than the line speed in order to write 3 packets in one memory module when scan-planes=2, number of memory module m=32, s=128 at traffic load=100%. Memory-write speed must be a maximum of 2 times faster than the line speed in order to write 2 packets in one memory module when scan-planes=4, number of memory module m=64, s=64 at traffic load=100%. Memory-write speed can be the same line speed for scan-planes number of 8 and 16.

TABLE 12

Worst Case Scenario of Multiple Packets Assigned to the Same Memory Module s = 256 in FIG. 20

| Number of SP at 100% Load | Ratio of 2 packets stored in 1 memory module | Ratio of 3 packets stored in 1 memory module | Ratio of 4 packets stored in 1 memory module |
|---|---|---|---|
| 2 | $4.9 \times 10^{-2}$ | $7.1 \times 10^{-5}$ | 0 |
| 4 | $2.1 \times 10^{-4}$ | 0 | 0 |
| 8 | 0 | 0 | 0 |
| 16 | 0 | 0 | 0 |

Figure 21:
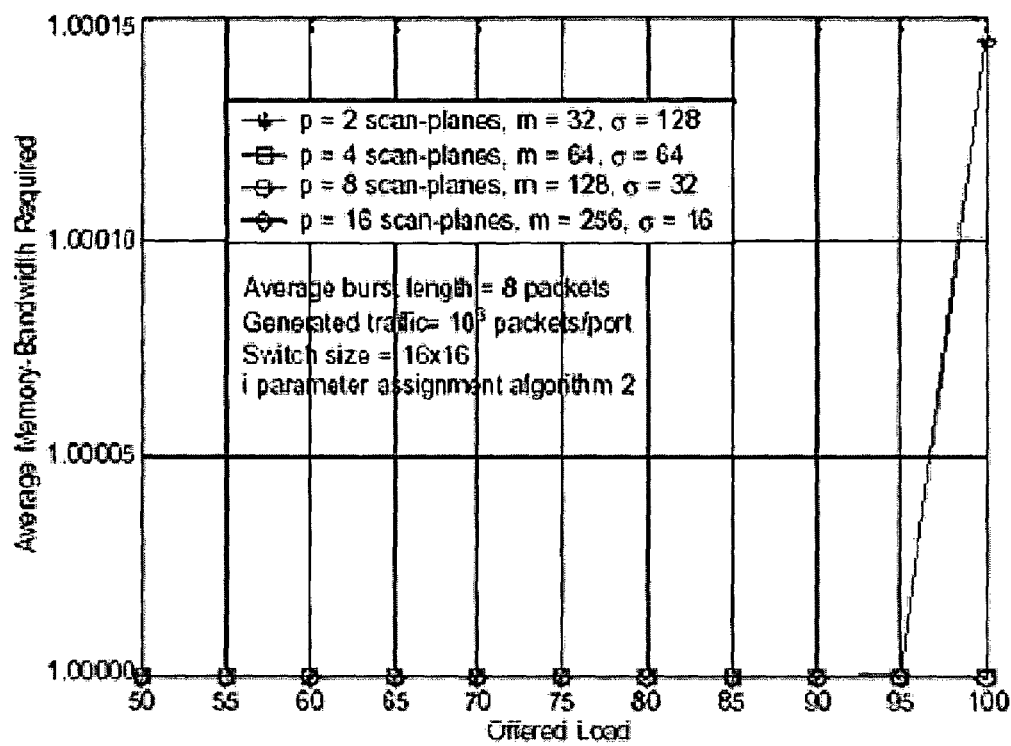
FIG. 21 shows a plot of an average memory-bandwidth required versus offered load, according to embodiments of the present invention.

Parameter assignment scheme (e.g., FIGS. 2B-2D) is simulated on 16×16 switch where scan-plane=2, the number of memory modules m=32, the number of memory locations per memory module s=128, and an average burst length=8 packets. In simulation, the number of memory locations per memory module has to be half of previous s size, while number of scan-planes is doubling. FIG. 21 shows that average memory bandwidth requirement is declined from 1.00014 to 1. The number of scan-planes are also increased because of the increase in the number of memory modules caused by the increase in the number of scan-planes. This increase will give enough number of consecutive parallel memory modules that reduce frequency of multiple packets stored in a one memory module. Table 13 shows that memory-write speed must be a maximum of 2 times faster than the line speed in order to write 2 packets in one memory module when scan-planes=2, number of memory module m=32, s=128 at traffic load=100%. The memory-write speed can be the same line speed for scan-planes number of 4, 8, and 16.

TABLE 13

Worst Case Scenario of Multiple Packets Assigned to the Same Memory Module s = 256 in FIG. 21

| Number of SP at 100% Load | Ratio of 2 packets stored in 1 memory module | Ratio of 3 packets stored in 1 memory module | Ratio of 4 packets stored in 1 memory module |
|---|---|---|---|
| 2 | $8.5 \times 10^{-6}$ | 0 | 0 |
| 4 | 0 | 0 | 0 |
| 8 | 0 | 0 | 0 |
| 16 | 0 | 0 | 0 |

Figure 22:
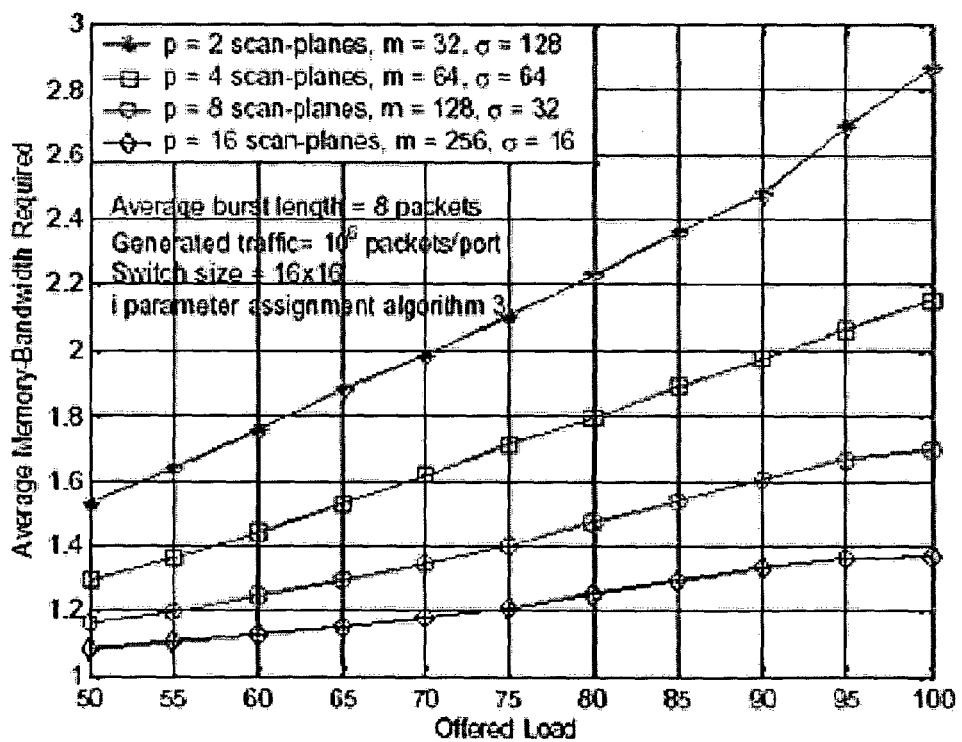
FIG. 22 shows a plot of an average memory-bandwidth required versus offered load, according to embodiments of the present invention.

Parameter assignment scheme (e.g., FIG. 3) is simulated on 16×16 switch where scan-plane=2, the number of memory modules m=32, the number of memory locations per memory module s=128, and average burst length=8 packets. FIG. 22 show that the average memory bandwidth requirement is decreasing significantly, while number of scan-planes are increasing because of the increase in number of scan-planes results lower probability (due to increase in number of memory modules) that multiple packets stored in one memory module using queue-based scheme. Table 14 shows that a memory-write speed must be maximum 9 times faster than the line speed in order to write 9 packets in one memory module when scan-planes=2.

TABLE 14

Worst Case Scenario of Multiple Packets Assigned
to the Same Memory Module s = 256 in FIG. 22

| Number of Packets in one Memory Module | Ratio of multiple packets in one memory module | | | |
|---|---|---|---|---|
| | $p = 2$ scan planes at 100% load | $p = 4$ scan planes at 100% load | $p = 8$ scan planes at 100% load | $p = 16$ scan planes at 100% load |
| 2 | $1.6 \times 10^{-1}$ | $1.1 \times 10^{-1}$ | $5.6 \times 10^{-2}$ | $2.6 \times 10^{-2}$ |
| 3 | $4.2 \times 10^{-2}$ | $1.2 \times 10^{-2}$ | $2.6 \times 10^{-3}$ | $4.8 \times 10^{-4}$ |
| 4 | $9.3 \times 10^{-3}$ | $1.2 \times 10^{-3}$ | $1 \times 10^{-4}$ | $1.3 \times 10^{-5}$ |
| 5 | $1.8 \times 10^{-3}$ | $9.6 \times 10^{-5}$ | $8.1 \times 10^{-7}$ | $1.9 \times 10^{-6}$ |
| 6 | $3.1 \times 10^{-4}$ | $7.7 \times 10^{-6}$ | $1.9 \times 10^{-7}$ | 0 |
| 7 | $4.6 \times 10^{-5}$ | $3.8 \times 10^{-7}$ | 0 | 0 |
| 8 | $6 \times 10^{-6}$ | $6.3 \times 10^{-8}$ | 0 | 0 |
| 9 | $1.2 \times 10^{-6}$ | 0 | 0 | 0 |
| 10 | 0 | 0 | 0 | 0 |

The above simulations show that for the parameter searching schemes of the present invention, doubling the number of scan-planes from 2 (number of memory module m=32, s=128) to 4 (number of memory module m=64, s=64) resulted in reduce memory-write speed requirement from 9 times to 8 times faster than line speed to write 8 packets in one memory module. Increasing the number of scan-planes from 4 (number of memory module m=64, s=64) to 8 (number of memory module m=128, s=32) reduces the memory-write speed requirement to 6 times faster than line speed in order to write 6 packets in one memory module. Additionally, increasing the scan-planes from 8 (number of memory module m=101 128, s=32) to 16 (number of memory modules m=256, s=16) decreases the memory write speed to 5 times faster than line speed. The total memory spaces used for all different scan-planes are equal (4096-packet) for these simulations. As a result, an increase in scan planes for an equal memory spaces significantly reduces both average memory bandwidth requirement and memory-write speed requirement for all parameter assigning schemes.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain compositions which are chemically related may be substituted for the compositions described herein while the same or similar results would be achieved. All such similar substitutes and modifications apparent to those skilled in the art are deemed to be within the spirit, scope and concept of the invention as defined by the appended claims.

REFERENCES

The following references are each incorporated herein by reference.

U.S. Pat. No. 5,649,217

U.S. Pat. No. 6,122,274

Irland, M. I., "Buffer management in a packet switch," IEEE Transactions on Communications, vol.26, pp. 328-337, 1978.

Kamoun, F. and Kleinrock, L., "Analysis of shared finite storage in a computer node environment under general traffic conditions," IEEE Transactions on Communications, vol.28, pp.992-1003, 1980.

Sakurai Y., Ido N., Gohara S., and Endo N., "Large-scale ATM multistage switching network with shared-memory switches," IEEE Communications, vol. 29, pp. 90-96, 1991.

Kumar S., "The Sliding-Window Packet Switch: A new class of packet switch architecture with plural memory modules and decentralized control," IEEE Journal on Selected Areas in Communications, Vol. 21, No. 4, pp. 656-673, May 2003

S. Kumar, T. Doganer and A. Munoz, "The Effect of Traffic Burstiness on Memory-Bandwidth of the Sliding-Window Switch," International Conference on Networking, March 2004.

Kumar S., and Doganer T., "Memory-Bandwidth Performance of the Sliding-Window based Routers/Switches" The proceedings of the IEEE Local and Metropolitan Area Networks, April 2004.

Choudhury, A. K. and Hahne, E. L., "Dynamic Queue Length Thresholds for Shared-Memory ATM Switch," IEEE/ACM Transactions of Networking, vol.6, no.2, pp.130-140.

A. S. Acampora, An Introduction to Broadband Networks: Lans, Mans, Atm, B-Isdn, and Optical Networks for Integrated Multimedia Telecommunications, Plenum Press, 1994

D. Comer, Computer Networks And Internets, Prentice Hall, Fourth Edition, 2003

H. J. Chao, C. H. Lam, E. Oki, Broadband Packet Switching Technologies: A Practical Guide to ATM Switches and IP Routers, John Wiley & Sons, New York, 2001

P. Newman, "Fast packet switching for broadband ISDN," Telecommunications, Second IEEE National Conference on, pp: 391-396, 2-5 April 1989

J. P. Coudreuse and M. Servel, "Prelude: an Asynchronous Time-Division Switch Network," ICC '87 Conf. Rec., paper 22.2, Seattle, Wash., June 1987

R. J. McMillen, "A survey of interconnection networks," In Proc. IEEE Globecom, pages: 105-113, November 1984

S. E. Minzer, "Broadband user-network interfaces to ISDN," In Proc. IEEE Int. Conf. Commun. (ICC '87), pages: 11.2.1-6, Seattle, June 1987

J. F. Mollenauer, "Standards for Metropolitan area networks," IEEE Commun. Mag., 26(4), 15-19, April 1988.

M. J. Narasimha, "The Batcher-banyan self-routing network: universality and simplification," IEEE Trans. Commun., 36(10), 1175-1178, October 1988. 104

H. Ahmadi, W. E. Denzel, C. A. Murphy, E. Port, "A high-performance switch fabric for integrated circuit and packet switching," In Proc. IEEE Infocom, pages: 9-18, N. Orleans, 1988

M. Ajmone, A. Bianco, E. Leonardo, "RPA: a simple efficient and flexible policy for input buffer ATM switches," IEEE Lett., vol. 1 no.3, pp. 83-86, May 1997

H. J. Chao, J. S. Park, "Centralized contention resolution schemes for a large capacity optical ATM switch," Proc. IEEE ATM Workshop, Fairfax, Va., May 1998.

H. J. Chao, "Satrun: a terabit packet switch using dual round-robin," IEEE Commun. Mag., vol. 38, no. 12, pp. 78-79, Dec 2000.

A. Charny, P. Krishna, N. Patel, R. Simcoe, "Algorithm for providing bandwidth and delay guarantees in input-buffered crossbar with speedup," Proc. IEEE IWQoS '98, pp 235-244, May 1998.

R. Guering, K. N. Sivarajan, "Delay and throughput performance of speeded-up input queueing packet switches," IBM Research Report RC 20892, June 1997.

M. G. Hluchyj, M. J. Karol, "Queueing in high-performance packet switching," IEEE J. Select Areas Commun., vol. 6, no.9, pp. 1587-1597, December 1998.

S. C. Liew, "Performance of a various input-buffered and output-buffered ATM switch design principles under bursty traffic: simulation study," IEEE Trans. Commun., vol. 42, no. 2/3/4, pp. 1371-1379, February/March/April 1994.

M. A. Marsan, A. Bianco, P. Giaccone, E. Leonardi, F. Neri, "Packet scheduling in input-queued cell-based switches," IEEE J. Select Areas Commun., 1998.

N. McKeown, "Scheduling algorithms for input-queued cell switches," Ph.D.105 thesis, University of California at Berkeley, 1995.

A. Mekkitikul, N. McKeown, "A starvation-free algorithm for achieving 100% throughput in an input-queued switch," in Proc. ICCCN'96, 1996.

A. Huang, S. Knauer, "Starlite: A wideband digital switch," In Proc. IEEE Globecom, pp. 121-125, November 1984.

M. G. Hluchyj, M. J. Karol, "Queueing in space division packet switching," In Proc. IEEE Infocom, pp. 334-343, New Orleans, March 1988.

Y. S. Yeh, M. G. Hluchyj, A. S. Acampora, "The Knock-out switch: A simple modular architecture for high performance packet switching," IEEE J. Select Areas Commun., SAC-5 (8), 1274-1283, October 1987.

M. De Prycker, Asynchronous Transfer Mode: Solution for Broadband ISDN, Second Edition (Chichester, England: Ellis Horwood, 1993)

J. P. Coudreuse and M. Servel, "Prelude: an Asynchronous Time-Division Switch Network," ICC '87 Conf. Rec., paper 22.2, Seattle, Wash., June 1987

J. Garcia-Haro, A. Jajszczyk, "ATM shared-memory switching architectures" Network, IEEE, Volume:8, Issue:4, Pages:18-26, July-August 1994

H. Lee, K. H. Kook, C. S. Rim, K. P. Jun, an S. K. Lim, "A Limited Shared Output Buffer Switch for ATM," Fourth International Conf. On Data Communications Systems and Their Performance, Barcelona, pp. 163-179, June 1990. 106

H. Kitamura, "A Study on Shared Buffer-Type ATM Switch," Electronics and Communications in Japan, Part 1, vol. 73, no. 11, pp. 58-64, 1990

K. Oshima, H. Yamanaka, H. Saito, H. Yamada, S. Kohama, H. Kondoh, and Y. Matsuda, "A new ATM switch architecture based on STS-type shared buffering and its LSI implementation," Proc IEICE, pp.359-363, 1992.

K. Yamanaka et al., "Scalable shared-buffering ATM switch with a versatile searchable queue," IEEE J. Select. Areas Commun., vol. 15, pp. 773-784, June 1997.

S. Kumar and D. P. Agrawal, "The sliding-window approach to high performance ATM switching for broadband networks," in Proc. IEEE GLOBECOM, London, U.K., December 1996, pp. 772-777.

Stephan D. Brown, Svonko G. Vranesic, Fundamentals of Digital Logic with VHDL Design with CD-ROM, Mc Graw-Hill, 1999

Delgado-Frias, J. G., Nyathi, J., "A VLSI high-performance encoder with priority lookahead VLSI," Proceedings of the 8th Great Lakes Symposium on, 19-21 Feb. 1998 Pages: 59-64

S. Kumar, T. Doganer, and A. Munoz, "Effect of traffic burstiness on memory bandwidth of the sliding-window switch architecture," 3rd International 107 Conference on Networking (ICN'2004), Gosier, Guadeloupe, French Caribbean, vol. I, pp. 147-151, February-March 2004

S. Kumar, A. Munoz, and T. Doganer, "Performance Comparison of memory sharing schemes for Internet switching architecture," 3rd International Conference on Networking (ICN'2004), Gosier, Guadeloupe, French Caribbean, vol. I, pp. 160-163, February-March 2004

S. Kumar, T. Doganer, "Memory-Bandwidth Performance of the Sliding-Window based Internet Routers/Switches," Accepted in IEEE Workshop on Local and Metropolitan Area Networks, San Francisco, Calif., April 2004. 108

The invention claimed is:

1. A method for assigning a memory module to an incoming packet, comprising the steps of:
   (a) setting a first and second counter value to zero;
   (b) modifying a parameter in a MOD m fashion to obtain a memory location of a memory module for the incoming packet, where m is the number of memory module;
   (c) using a scan table to determine if the memory location is available, and where if the memory location is not available,
   (d) incrementing the second counter;
   (e) modifying the parameter in a MOD m fashion until a memory module is available;
   (f) setting a value associated with the available memory module to the first counter; and
   (g) assigning the memory module to the incoming packet.

2. The method of claim 1, where the first counter determines a first available memory module if all memory modules are not available.

3. The method of claim 1, further comprising determining if the available memory module is pre-assigned by previous incoming packets prior to step (e).

4. The method of claim 3, where if the memory module is pre-assigned, determining if the value of the second counter is m.

5. The method of claim 4, where if the value of the second counter is less than m, repeating step (e).

6. The method of claim 1, where the MOD m operation comprises a counter counting up to m.

7. A computer readable medium encoded with instructions capable of being executed by a processor to perform the steps of:
   (a) setting a first and second counter value to zero;
   (b) modifying a parameter in a MOD m fashion to obtain a memory location of a memory module for the incoming packet, where m is the number of memory modules;
   (c) using a scan table to determine if the memory location is available, and where if the memory location is not available,
   (d) incrementing the second counter;
   (e) modifying the parameter in a MOD m fashion until a memory module is available;
   (f) setting a value associated with the available memory module to the first counter; and
   (g) assigning the memory module to the incoming packet.

* * * * *